(12) United States Patent
Risher

(10) Patent No.: US 9,551,920 B2
(45) Date of Patent: Jan. 24, 2017

(54) TENSIONED PROJECTION SCREEN ASSEMBLY

(71) Applicant: Draper, Inc., Spiceland, IN (US)

(72) Inventor: Kenneth M. Risher, Indianapolis, IN (US)

(73) Assignee: Draper, Inc., Spiceland, IN (US)

( * ) Notice: Subject to any disclaimer, the term of this patent is extended or adjusted under 35 U.S.C. 154(b) by 0 days.

(21) Appl. No.: 14/731,061

(22) Filed: Jun. 4, 2015

(65) Prior Publication Data

US 2015/0268549 A1 Sep. 24, 2015

Related U.S. Application Data

(62) Division of application No. 13/377,755, filed as application No. PCT/US2010/038559 on Jun. 14, 2010, now Pat. No. 9,110,362.

(60) Provisional application No. 61/186,796, filed on Jun. 12, 2009.

(51) Int. Cl.
| | |
|---|---|
| *G03B 21/56* | (2006.01) |
| *G03B 21/625* | (2014.01) |
| *G03B 21/62* | (2014.01) |
| *G03B 21/58* | (2014.01) |
| *G03B 21/60* | (2014.01) |
| *G03B 21/10* | (2006.01) |

(52) U.S. Cl.
CPC ............. *G03B 21/56* (2013.01); *G03B 21/10* (2013.01); *G03B 21/58* (2013.01); *G03B 21/60* (2013.01); *G03B 21/62* (2013.01); *G03B 21/625* (2013.01); *Y10T 29/49826* (2015.01); *Y10T 29/49947* (2015.01)

(58) Field of Classification Search
CPC ...................................................... G03B 21/56
USPC .......................... 348/789, 840; 359/443–461
See application file for complete search history.

(56) References Cited

U.S. PATENT DOCUMENTS

| | | | | |
|---|---|---|---|---|
| 1,524,793 | A | | 2/1925 | Lemery |
| 1,662,586 | A | | 3/1928 | Newman |
| 2,086,729 | A | * | 7/1937 | Moss ...................... G03B 21/62 |
| | | | | 106/170.29 |
| 2,133,120 | A | * | 10/1938 | Stableford ........... G03B 21/565 |
| | | | | 160/181 |
| 2,827,955 | A | | 3/1958 | Hurley |
| 2,865,124 | A | * | 12/1958 | Domenico |
| | | | | Mortellito ........... G09F 15/0068 |
| | | | | 40/605 |

(Continued)

FOREIGN PATENT DOCUMENTS

| | | | |
|---|---|---|---|
| CN | 36205959 U | | 8/1987 |
| CN | 2185905 Y | | 12/1994 |

(Continued)

OTHER PUBLICATIONS

International Search Report in PCT/US2010/038559, Nov. 19, 2010 (6 pages).

(Continued)

*Primary Examiner* — Clayton E Laballe
*Assistant Examiner* — Kevin Butler
(74) *Attorney, Agent, or Firm* — Faegre Baker Daniels LLP

(57) ABSTRACT

A projection screen assembly is disclosed including a projection screen and a projection screen frame. The projection screen frame includes a plurality of projection screen frame modules that may be coupled together to provide a projection frame for projection screens of different sizes.

18 Claims, 28 Drawing Sheets

(56) References Cited

U.S. PATENT DOCUMENTS

| | | | |
|---|---|---|---|
| 3,041,032 A * | 6/1962 | Wilcox | G03B 21/58 248/170 |
| 3,211,089 A | 10/1965 | Messerschmitt | |
| 3,485,165 A * | 12/1969 | Hughes | B07B 1/48 101/127.1 |
| 3,583,466 A * | 6/1971 | Dreyer | G03B 21/58 160/351 |
| 3,591,992 A | 7/1971 | Pawlicki | |
| 3,608,482 A | 9/1971 | Bubley | |
| 3,655,203 A | 4/1972 | Gretzky | |
| 3,853,466 A | 12/1974 | Rittersdorf et al. | |
| 3,867,019 A | 2/1975 | Eyerman | |
| 3,875,623 A | 4/1975 | Johnston | |
| 3,885,335 A | 5/1975 | Egermayer | |
| 4,017,152 A | 4/1977 | Allen | |
| 4,097,013 A | 6/1978 | Broome | |
| 4,329,716 A | 5/1982 | Porco | |
| 4,409,749 A | 10/1983 | Hamu | |
| 4,444,240 A | 4/1984 | Bannister | |
| 4,479,340 A | 10/1984 | Alphonse et al. | |
| 4,580,361 A | 4/1986 | Hillstrom et al. | |
| 4,802,734 A | 2/1989 | Walter | |
| 4,842,035 A | 6/1989 | Thompson | |
| 4,942,686 A | 7/1990 | Kemeny | |
| 4,999,938 A | 3/1991 | Behling | |
| 5,033,216 A | 7/1991 | Gandy et al. | |
| 5,054,255 A | 10/1991 | Maninfior | |
| 5,103,339 A * | 4/1992 | Broome | G03B 21/10 348/E5.144 |
| 5,400,178 A * | 3/1995 | Yamada | G03B 21/62 359/443 |
| 5,461,510 A * | 10/1995 | Vilnes | G09F 15/00 348/840 |
| 5,467,546 A * | 11/1995 | Kovalak, Jr. | G09F 15/0025 160/378 |
| 5,501,051 A | 3/1996 | Harlan | |
| 5,517,779 A | 5/1996 | Coleman | |
| 5,673,145 A * | 9/1997 | Wilson | G03B 21/02 348/E5.144 |
| 5,737,123 A | 4/1998 | Donohoe | |
| 5,818,639 A | 10/1998 | Furuya | |
| 5,926,153 A * | 7/1999 | Ohishi | G09B 9/32 345/1.1 |
| 6,008,938 A * | 12/1999 | Suehle | G03B 21/585 359/443 |
| 6,073,376 A | 6/2000 | Verret | |
| 6,084,707 A | 7/2000 | Maruyama et al. | |
| 6,191,886 B1 | 2/2001 | Sinkoff | |
| 6,220,709 B1 | 4/2001 | Heger | |
| 6,249,377 B1 | 6/2001 | Takamoto et al. | |
| 6,279,644 B1 | 8/2001 | Wylie | |
| 6,318,255 B1 | 11/2001 | Larson | |
| 6,327,082 B1 * | 12/2001 | Browning | G03B 21/10 248/200 |
| 6,331,223 B1 | 12/2001 | Wylie et al. | |
| 6,334,687 B1 | 1/2002 | Chino et al. | |
| 6,393,748 B1 | 5/2002 | Cooper | |
| 6,414,650 B1 * | 7/2002 | Nicholson | G06F 3/147 345/1.1 |
| 6,466,369 B1 | 10/2002 | Maddock | |
| 6,470,562 B1 | 10/2002 | Simone et al. | |
| 6,594,078 B2 * | 7/2003 | Clifton | H04N 9/12 348/383 |
| 6,606,809 B2 | 8/2003 | Hillstrom et al. | |
| 6,677,918 B2 * | 1/2004 | Yuhara | G09F 9/33 345/1.3 |
| 6,701,994 B2 * | 3/2004 | Goldenberg | E06B 9/54 160/120 |
| 6,712,118 B2 * | 3/2004 | Nussdorf | G09F 15/0068 160/351 |
| 6,785,047 B1 * | 8/2004 | Risher | G03B 21/58 359/443 |
| 6,870,672 B2 | 3/2005 | Stumpfl | |
| 6,873,458 B1 | 3/2005 | Bakkom et al. | |
| 3,024,881 A1 | 9/2005 | Redmon | |
| 7,113,332 B1 | 9/2006 | Risher | |
| 7,259,912 B2 | 8/2007 | Gohman et al. | |
| 7,316,257 B2 | 1/2008 | Cameron et al. | |
| 7,352,507 B2 | 4/2008 | Sample | |
| 7,369,310 B1 * | 5/2008 | Risher | G03B 21/56 359/443 |
| 7,372,628 B2 | 5/2008 | Karlsen et al. | |
| 7,433,121 B2 * | 10/2008 | Imafuku | G03B 21/625 359/443 |
| 7,446,937 B2 | 11/2008 | Poretskin | |
| 7,481,013 B2 | 1/2009 | Black | |
| 7,499,213 B2 * | 3/2009 | Uchino | G03B 21/56 348/744 |
| 7,706,066 B2 * | 4/2010 | Adams | G03B 21/56 359/443 |
| 7,797,869 B2 | 9/2010 | Tollis et al. | |
| 7,808,702 B1 | 10/2010 | Risher | |
| 7,933,068 B2 * | 4/2011 | Peterson | G03B 21/58 359/443 |
| 7,936,505 B2 * | 5/2011 | Enochs | G03B 21/56 359/443 |
| 8,184,213 B2 * | 5/2012 | Yuzawa | G03B 21/58 160/377 |
| 8,199,401 B2 * | 6/2012 | Ninan | H04N 9/3102 345/102 |
| 8,238,023 B2 | 8/2012 | Enochs | |
| 8,462,432 B2 | 6/2013 | Enochs | |
| 8,531,763 B2 * | 9/2013 | Mizumoto | G03B 21/602 359/443 |
| 8,941,917 B2 | 1/2015 | Enochs | |
| 2002/0063956 A1 * | 5/2002 | Edwards | G03B 21/56 359/449 |
| 2003/0099036 A1 * | 5/2003 | Edwards | G03B 21/56 359/450 |
| 2005/0200951 A1 | 9/2005 | Redmon | |
| 2006/0262392 A1 | 11/2006 | Sample | |
| 2007/0000849 A1 | 1/2007 | Lutz et al. | |
| 2007/0121206 A1 | 5/2007 | Liang et al. | |
| 2007/0153375 A1 | 7/2007 | Peterson et al. | |
| 2008/0158669 A1 * | 7/2008 | O'Keefe | G03B 27/56 359/443 |
| 2010/0079860 A1 * | 4/2010 | Unno | G03B 21/58 359/443 |
| 2010/0257801 A1 | 10/2010 | Anderson | |
| 2012/0206661 A1 * | 8/2012 | Risher | G03B 21/56 348/789 |

FOREIGN PATENT DOCUMENTS

| | | | | |
|---|---|---|---|---|
| CN | 2783375 Y | | 5/2006 | |
| CN | 2819260 Y | | 9/2006 | |
| CN | 200950203 Y | | 9/2007 | |
| EP | 1202162 | * | 5/2002 | G06F 3/14 |
| EP | 2029899 | * | 3/2009 | F16B 12/00 |
| JP | 49-000595 | | 1/1974 | |
| JP | 03-047356 | | 5/1991 | |
| JP | H05202648 | | 8/1993 | |
| JP | 07-139062 | | 5/1995 | |
| JP | H11265153 | * | 9/1999 | G09F 9/00 |
| JP | 2000-064463 | | 2/2000 | |
| JP | 2003-295323 | * | 10/2003 | G03B 21/00 |
| JP | 2003-325258 | | 11/2003 | |
| JP | 2005-221609 | | 8/2005 | |
| JP | 2005-336770 | | 12/2005 | |
| JP | 2007528266 | | 10/2007 | |
| WO | 2007102443 | | 9/2007 | |
| WO | 2008027889 | | 3/2008 | |

OTHER PUBLICATIONS

Written Opinion in PCT/US2010/038559, Nov. 19, 2010 (8 pages).
International Preliminary Report on Patentability in PCT/US2010/038559, Aug. 1, 2011 (11 pages).
European Search Report in EP10786980, Jun. 28, 2013 (5 pages).

(56) References Cited

OTHER PUBLICATIONS

Japanese Decision to Grant in JP2012-515223, Jan. 6, 2015 (3 pages).
Chinese Search Report in CN201080035572, Jun. 4, 2014 (1 page).
Japanese Office Action in JP2015-044944, Jan. 26, 2016 (6 pages).
Response to Japanese Office Action in JP2015-044944, Apr. 21, 2016, English Translation (13 pages).
Notification of Reasons for Rejection, JPO, JP2015-044944 to Draper Inc., Oct. 25, 2016 (8 pages).

* cited by examiner

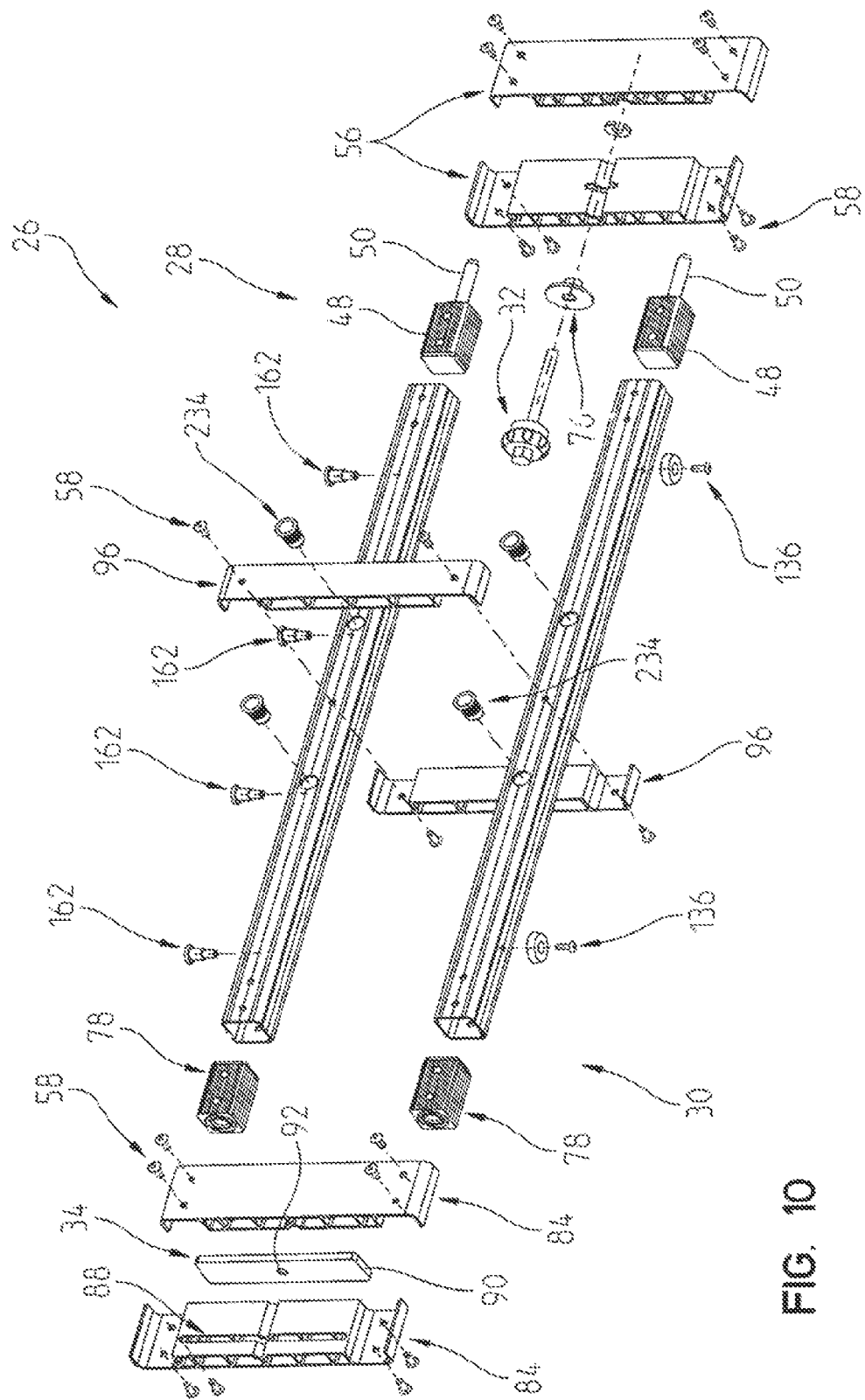

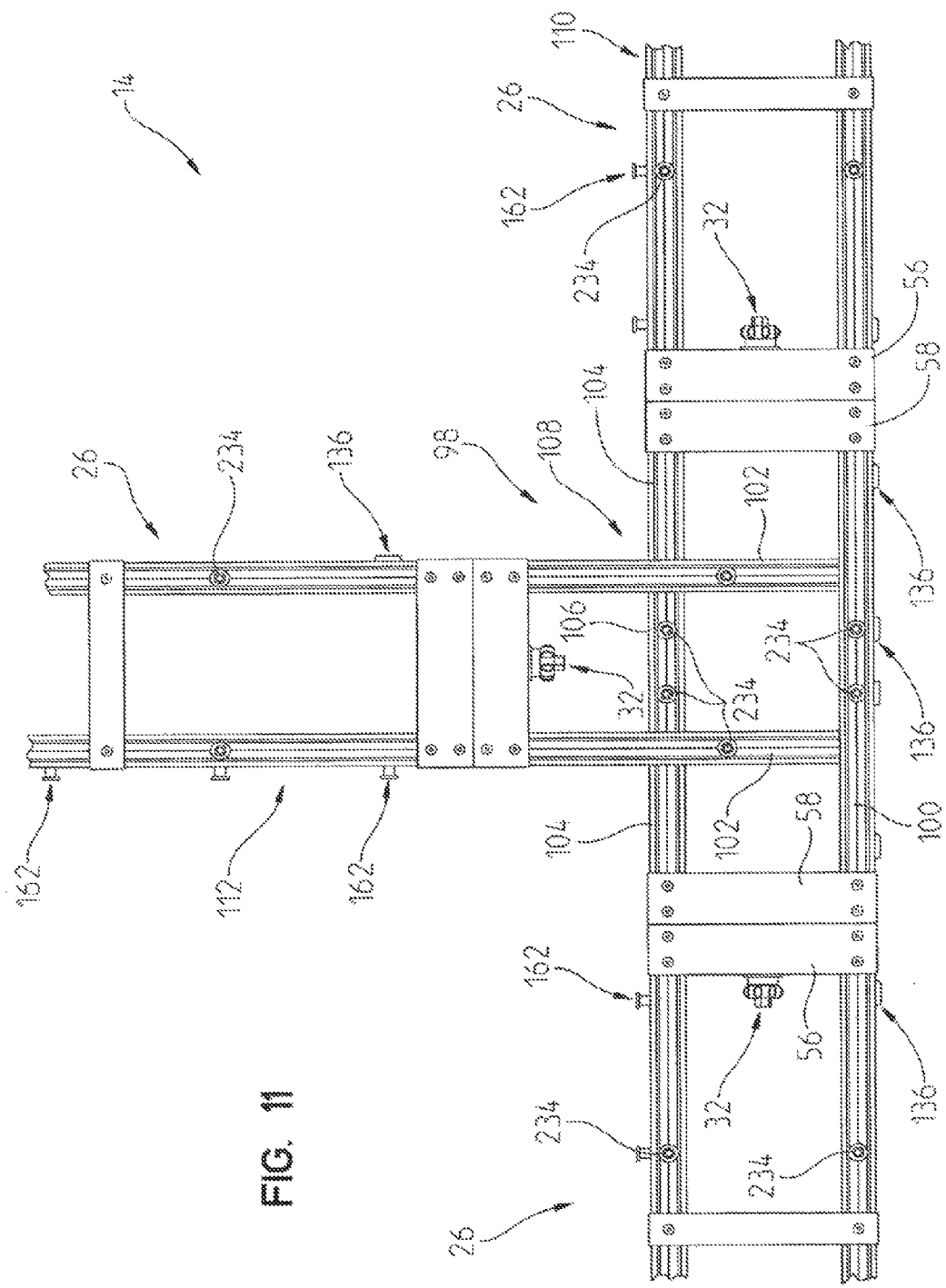

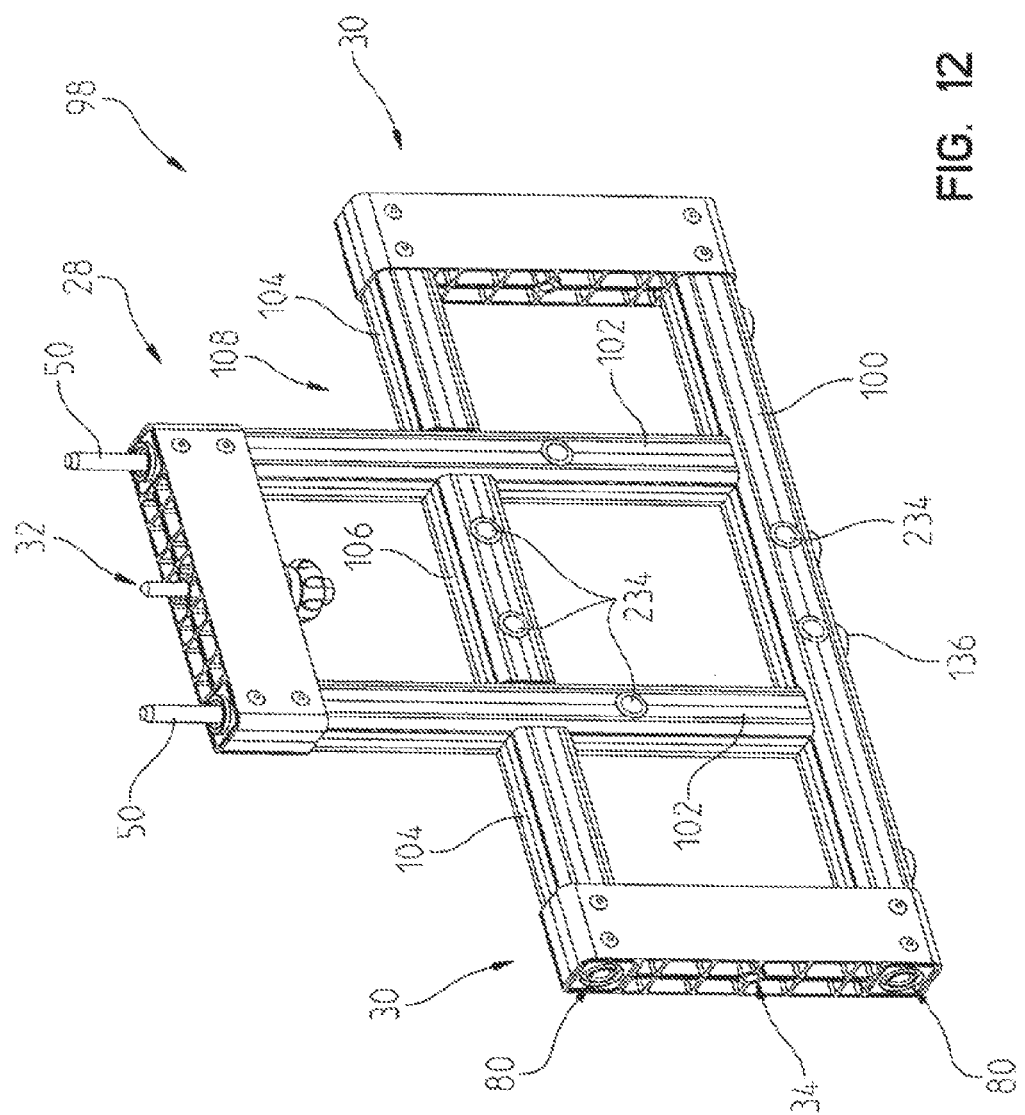

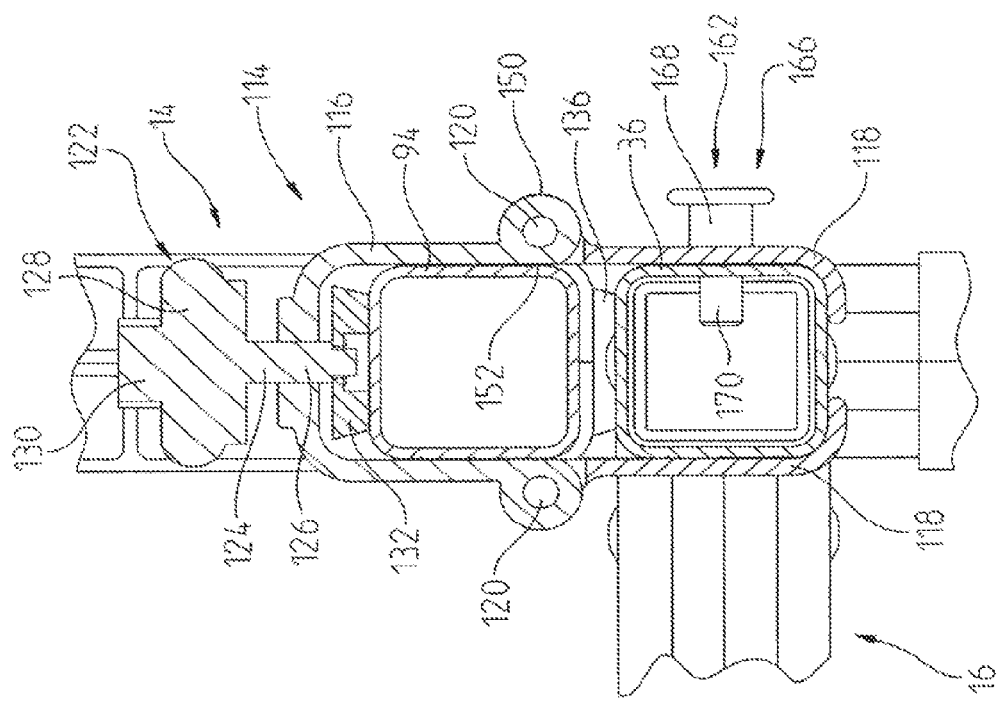

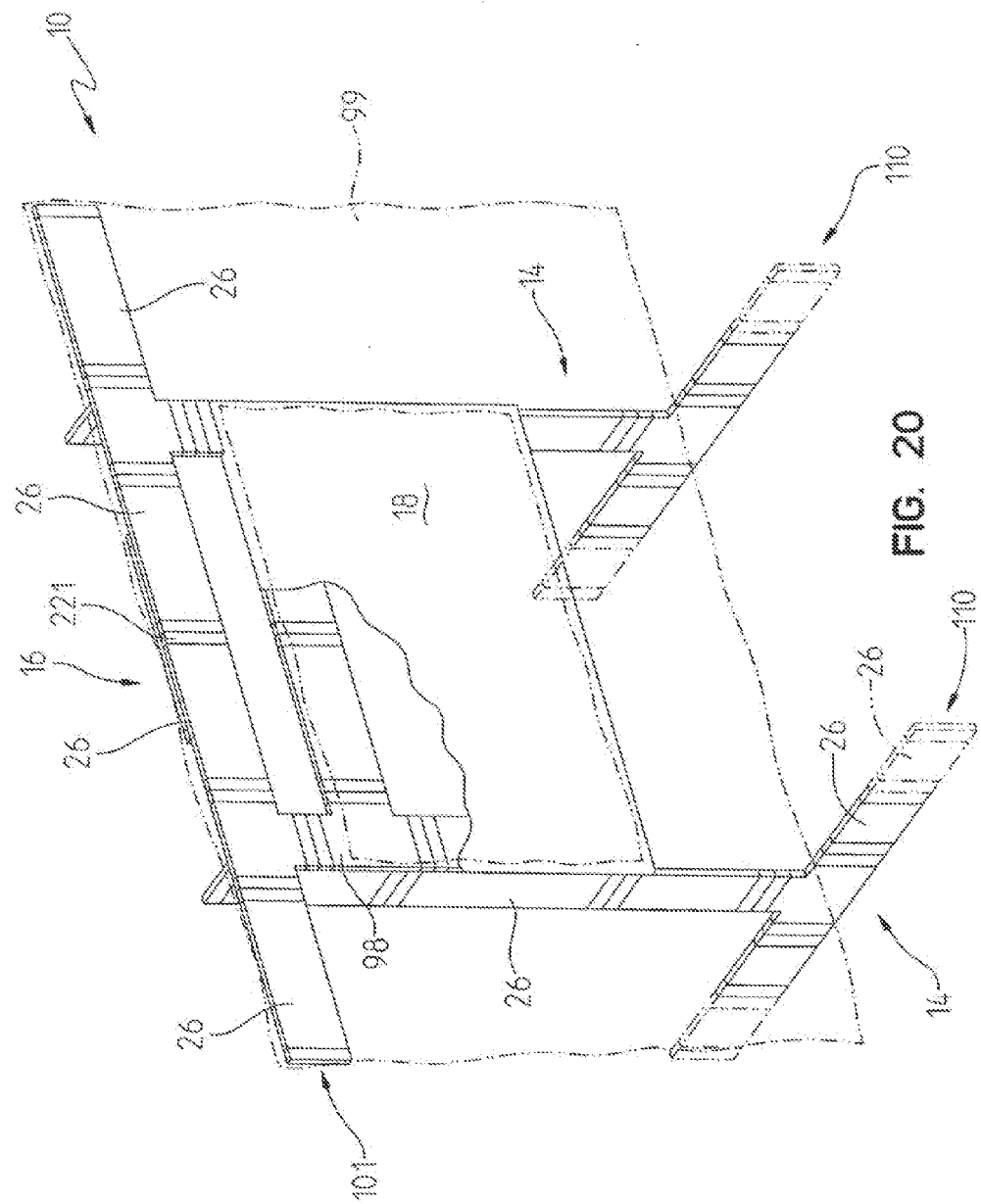

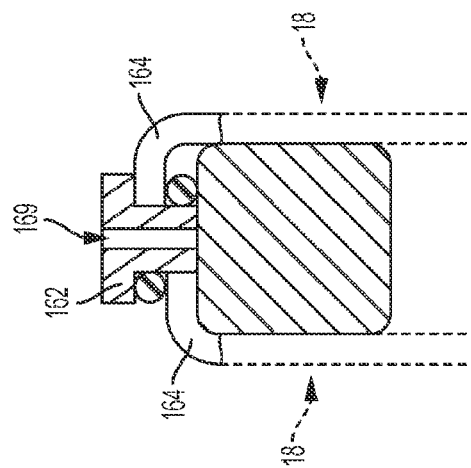
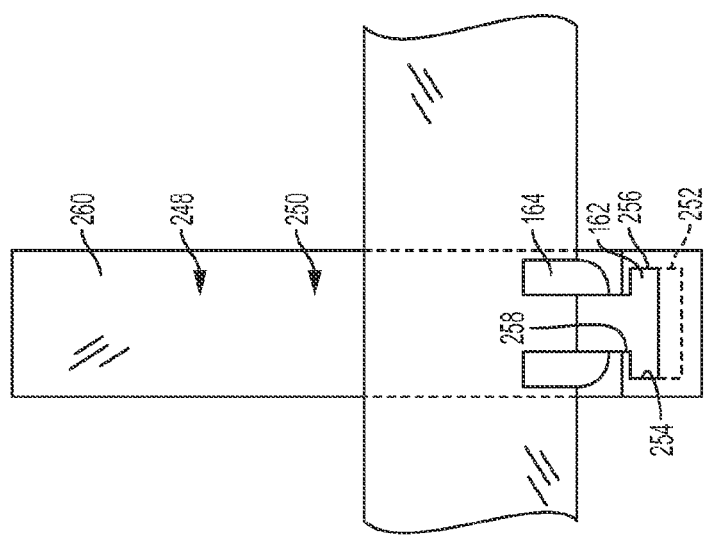
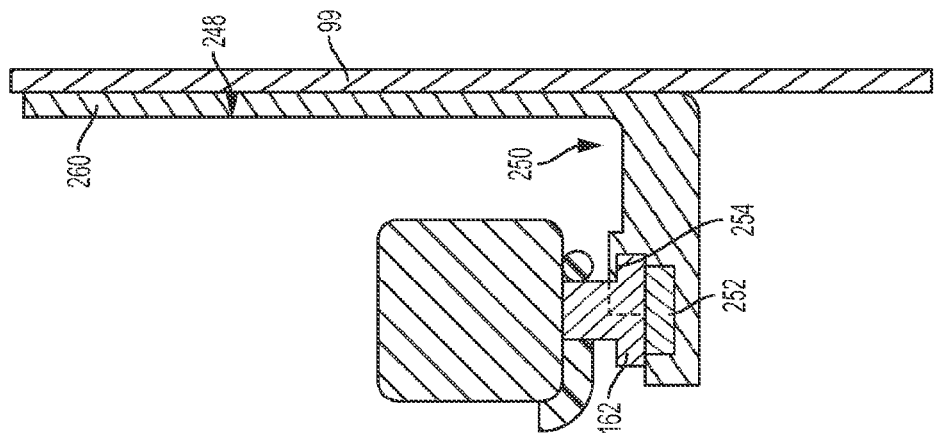

TENSIONED PROJECTION SCREEN ASSEMBLY

RELATED APPLICATIONS

The present application is a divisional application of U.S. patent application Ser. No. 13/377,755, filed Apr. 30, 2012, titled TENSIONED PROJECTION SCREEN ASSEMBLY, which is a nationalization under 37 U.S.C. §371 of International Application No. PCT/US2010/038559 to Risher, filed Jun. 14, 2010, titled TENSIONED PROJECTION SCREEN ASSEMBLY, which claims the priority benefit of U.S. Provisional Patent Application Ser. No. 61/186,796 to Risher, filed Jun. 12, 2009, titled "Tensioned Projection Screen," the entire disclosures of which are expressly incorporated by reference herein.

FIELD OF THE INVENTION

The present disclosure relates a projection screen assembly, more particularly, a projection screen assembly having a screen held by tension on a frame.

BACKGROUND OF THE INVENTION

Projection screen assemblies are provided to display images, typically projected from a source, such as a projector. The images often depict movies or other forms of entertainment, but can also depict other images, such as advertising.

According to one aspect of the present disclosure, a projection screen kit is provided including a plurality of projection screens including a first projection screen having a first viewing area adapted to display an image projected onto the first projection screen and a second projection screen having a second viewing area adapted to display an image projected onto the second projection screen. The kit further includes a plurality of frame modules adapted to be assembled to define an assembled frame for each of the plurality of the plurality of projection screens. Each assembled frame is sized to support at least one of the plurality of projection screens. Each assembled frame for the plurality of projection screens requires a number of frame modules to support at least one of the plurality of projection screens. The total number of frame modules in the kit is less than the sum of the frame modules required to assemble all of the plurality of assembled frames at one time.

According to another aspect of the present disclosure projection screen apparatus is provided including a projection screen including a viewing surface adapted to display an image projected onto the projection screen and a plurality of connectors, and a projection screen frame having an outward facing perimeter surface and a plurality of connectors coupled to the outward facing perimeter surface. The plurality of connectors of the projection screen connect with the plurality of connectors of the projection screen frame to connect the projection screen to the projection screen frame.

According to another aspect of the present disclosure, a projection screen apparatus is provided that includes a projection screen including a viewing surface adapted to display an image projected onto the projection screen and a plurality of connectors, and a projection screen frame supporting the projection screen. The projection screen includes a plurality of frame modules. Adjacent frame modules are coupled together to define a joint therebetween. Each frame module has a first end and a second end positioned clockwise of the first end. The projection screen frame further includes a plurality of connectors including a first connector coupled to each frame module adjacent to the first end of each frame module and a second connector coupled to each frame module adjacent the second end of each frame module. All of the first connectors are positioned the same distance from the first ends of the frame module to which it is coupled. All of the second connectors are positioned the same distance from the second ends of the frame module to which it is coupled.

According to another aspect of the present disclosure, a projection screen apparatus is provided including a projection screen including a viewing surface adapted to display an image projected onto the projection screen and a plurality of bungee connectors extending from a perimeter of the projection screen, and a projection screen frame supporting the projection screen. The bungee connectors extend to the projection screen frame.

According to another aspect of the present disclosure, a projection screen apparatus is provided including a projection screen including a viewing surface adapted to display an image projected onto the projection screen and a plurality of loop connectors extending from a perimeter of the projection screen, and a projection screen frame including a plurality of posts. The loop connectors of the projection screen extend around the plurality of posts to support the projection screen.

According to another aspect of the present disclosure, a projection screen apparatus is provided including a projection screen including a viewing surface adapted to display an image projected onto the projection screen and a plurality of bungee connectors. Each bungee connector has at least one terminal end. The projection screen further includes a projection screen frame supporting the projection screen. The bungee connectors extend to the projection screen frame.

According to another aspect of the present disclosure, a projection screen apparatus is provided including a projection screen including a viewing surface adapted to display an image projected onto the projection screen and a plurality of bungee connectors permanently coupled to the projection screen, and a projection screen frame supporting the projection screen. The bungee connectors coupling the projection screen to the projection screen frame.

According to another aspect of the present disclosure, a projection screen apparatus is provided including a projection screen including a first sheet defining a perimeter of the projection screen, at least one molded plastic sheet coupled to the first sheet, and at least one connector coupled to the at least one molded plastic sheet, and a projection screen frame supporting the projection screen. The at least one connector couples the projection screen to the projection screen frame.

According to another aspect of the present disclosure, a projection screen apparatus including a projection screen including a first sheet defining a perimeter of the projection screen and at least one second sheet coupled to the first sheet. The second sheet having a stiffness that increases from an inner end to an outer end. The projection screen further includes at least one connector coupled to the at least one second sheet. The projection screen apparatus further includes a projection screen frame supporting the projection screen. The at least one connector couples the projection screen to the projection screen frame.

According to another aspect of the present disclosure, a projection screen apparatus is provided including a projection screen including a first sheet defining a perimeter of the projection screen, at least one second sheet coupled to the first sheet, and a bungee received in the at least one second sheet, and a projection screen frame supporting the projection screen. The at least one bungee couples the projection screen to the projection screen frame.

According to another aspect of the present disclosure, a projection screen apparatus is provided including a projection screen includes a first sheet defining a perimeter of the projection screen, at least one tube, and a cord received in the tube, and a projection screen frame supporting the projection screen. The at least one cord couples the projection screen to the projection screen frame.

According to another aspect of the present disclosure, a projection screen apparatus is provided including a projection screen including a viewing surface adapted to display an image projected onto the projection screen and a plurality of connectors, and a projection screen frame supporting the projection screen. The projection screen frame includes a plurality of posts. The plurality of connectors connect to the plurality of posts to couple the projection screen to the projection screen frame.

According to another aspect of the present disclosure, a projection screen apparatus is provided including at least one projection screen including a viewing surface adapted to display an image projected onto the projection screen and a plurality of connectors, an accessory having at least one connector, and a projection screen frame supporting the projection screen. The projection screen frame includes a plurality of connectors. The plurality of connectors of the projection screen connect to the plurality of connectors of the projection screen frame to couple the projection screen to the projection screen frame. At least one of the plurality of connectors of the projection screen frame connects to at least one connector of the at least one projection screen at least one connector of the accessory.

According to another aspect of the present disclosure, a projection screen apparatus is provided including a first projection screen including a viewing surface adapted to display an image projected onto the first projection screen, a second projection screen including a viewing surface adapted to display an image projected onto the second projection screen, and a projection screen frame supporting the first and second projection screens with the viewing surface of the first projection screen facing away from the viewing surface of the second projection screen.

According to another aspect of the present disclosure, a projection screen apparatus is provided including a projection screen including a viewing surface adapted to display an image projected onto the projection screen and a plurality of connectors spaced apart by a uniform distance, and a projection screen frame supporting the projection screen. The projection screen includes a plurality of frame modules. Each frame module has a length that is a multiple of the uniform distance.

According to another aspect of the present disclosure, a projection screen apparatus is provided including a projection screen having a height, a width and a thickness, and a projection screen frame supporting the projection screen. The height of the projection screen is greater than a height of the height of the projection screen frame by more than the thickness of the projection screen.

According to another aspect of the present disclosure, a projection screen apparatus is provided including a projection screen adapted to display an image projected onto the projection screen, a projection screen frame supporting the projection screen, at least one leg supporting the projection screen frame on the ground, and at least one connector coupling the at least one leg to the projection screen frame. At least one of an outer surface of the leg and a surface of the connector define a junction including a groove and a tooth received in the groove.

According to another aspect of the present disclosure, a projection screen apparatus is provided including a projection screen adapted to display an image projected onto the projection screen, a projection screen frame supporting the projection screen, at least one leg supporting the projection screen frame on the ground, and at least one connector coupling the at least one leg to the projection screen frame. The connector wraps around at least a portion of the at least one leg.

According to another aspect of the present disclosure, a projection screen apparatus is provided including a projection screen adapted to display an image projected onto the projection screen, a projection screen frame supporting the projection screen, at least one leg supporting the projection screen frame on the ground, and at least one connector having base and a pair of arms. The base receives a portion of at least one of the projection screen frame and the leg and the pair of arms cooperate to receive the other of the projection screen frame and the leg between the arms.

According to another aspect of the present disclosure, a projection screen apparatus is provided that includes a projection screen adapted to display an image projected onto the projection screen and a plurality of connectors and a projection screen frame supporting the projection screen. The projection screen includes a plurality of connectors coupling to the plurality of connectors of the projection screen. The projection screen apparatus further includes at least one drape and at least one drape support connected to at least one of the plurality of connecters of the projection screen frame and support the drape.

According to another aspect of the present disclosure, a projection screen apparatus is provided including a projection screen adapted to display an image projected onto the projection screen and a projection screen frame supporting the projection screen. The projection screen frame includes a plurality of frame modules having longitudinal axes. Adjacent frame modules cooperate to define a joint therebetween. The projection screen apparatus further includes at least one frame coupler coupling together adjacent frame modules cooperating to define a joint. The at least one coupler pulls the adjacent frame modules axially toward each other.

According to another aspect of the present disclosure, a projection screen apparatus is provided including a projection screen adapted to display an image projected onto the projection screen and a projection screen frame supporting the projection screen. The projection screen frame including a plurality of frame modules including first and second adjacent frame modules cooperating to define a joint therebetween. The first adjacent frame module includes a slot. The projection screen apparatus further includes at least one frame coupler coupling together adjacent frame modules that cooperate to define a joint. The at least one frame coupler including a plate positioned in the slot and a threaded member coupled to the second adjacent frame module and positioned in a threaded aperture of the plate.

According to another aspect of the present disclosure, a projection screen apparatus is provided including a projection screen adapted to display an image projected onto the projection screen, and a projection screen frame supporting the projection screen. The projection screen including a plurality of frame modules including first and second adjacent frame modules coupled together and cooperating to define a joint therebetween. The first and second adjacent frame modules have longitudinal axes. The first adjacent frame module includes an axially extending protrusion having a surface defining an acute angle with the axis of the first adjacent frame module. The second adjacent frame module includes a recess receiving the axially extending protrusion of the first adjacent frame module. The recess is defined by a surface that contacts the surface of the axially extending protrusion.

According to another aspect of the present disclosure, a projection screen apparatus is provided including a projection screen adapted to display an image projected onto the projection screen. The projection screen has a top portion, bottom portion, and side portions extending between the top and bottom portions. The projection screen apparatus further includes a projection screen frame supporting the projection screen in a vertical position. The projection screen frame has a top portion positioned adjacent to the top portion of the projection screen, a bottom portion positioned adjacent to the bottom portion of the projection screen, and side portions extending between the top portion and the bottom portion of the projection screen. The side portions of the projection screen frame are positioned adjacent to the side portions of the projection screen. The top portion of the projection screen frame has resilient feet.

According to another aspect of thee the present disclosure, a projection screen apparatus is provided including a projection screen adapted to display an image projected onto the projection screen, a projection screen frame supporting the projection screen, and at least one leg supporting the projection screen frame on the ground. The at least one leg having a plurality of frame modules including a horizontal member and a vertical member that is interchangeable with the horizontal member.

According to another aspect of the present disclosure, a projection screen apparatus is provided including a projection screen adapted to display an image projected onto the projection screen and a projection screen frame supporting the projection screen. The projection screen includes a plurality of frame modules including first and second adjacent frame modules coupled together by a coupler and cooperating to define a joint therebetween. The projection screen apparatus further includes a stiffener extending across the joint to further couple the first and second adjacent members together.

According to another aspect of the present disclosure, a projection screen apparatus is provided including a projection screen adapted to display an image projected onto the projection screen, a projection screen frame including a plurality of frame modules supporting the projection screen, and at least one leg including a plurality of frame modules supporting the projection screen frame on the ground. At least one of the frame modules of the at least one leg is interchangeable with the plurality of frame modules of the projection screen frame.

According to another aspect of the present disclosure, a method of constructing a projection screen apparatus is provided. The method includes the steps of receiving at least one pre-manufactured projection screen and a plurality of pre-manufactured frame modules, selecting a subset of the plurality of pre-manufactured frame modules sufficient to construct a projection screen frame corresponding to the at least one pre-manufactured projection screen, constructing the projection screen frame using the subset of the plurality of pre-manufactured frame modules, and coupling the pre-manufactured projection screen to the projection screen frame.

According to another aspect of the present disclosure, a method of facilitating constructing a projection screen apparatus is provided. The method includes the steps of receiving a projection screen and a plurality of pre-manufactured frame modules, selecting a subset of the plurality of pre-manufactured frame modules sufficient to construct a projection screen frame corresponding to the at least one pre-manufactured projection screen, providing the subset of the plurality of pre-manufactured frame modules to another party, and providing instructions on the construction of the projection screen frame from the pre-manufactured frame modules to the party.

According to another aspect of the present disclosure, a method of facilitating construction of a projection screen apparatus is provided. The method includes the steps of providing a projection screen requiring a projection screen frame of a predetermined size to support the projection screen during use, providing a plurality of frame modules greater than the number of projection frame modules necessary to construct the projection screen frame, sending the projection screen to another party, and sending the plurality of frame modules to the party for use in constructing the projection screen frame to support the projection screen during use.

According to another aspect of the present disclosure, a method of facilitating construction of a projection screen apparatus is provided including the steps of collecting a plurality of projection screens requiring a plurality of projection screen frames of a predetermined size to support the plurality of projection screens during use, collecting a plurality of projection screen frame modules less than the number of projection screen frame modules necessary to construct the plurality of projection screen frames at one time, providing the plurality of projection screens to another party, and providing the plurality of frame modules to the party for use in constructing at least one of the plurality of projection screen frames.

According to another aspect of the present disclosure, a method of constructing a projection screen apparatus is provided. The method includes the steps of providing a projection screen and a plurality of frame modules, the plurality of frame modules including at least two identical frame modules, constructing a projection screen frame with the plurality of frame modules including at least one identical frame module, supporting the projection screen with the projection screen frame, constructing at least one leg with the plurality of frame modules including at least one identical frame module, and supporting the projection screen frame with the at least one leg.

BRIEF DESCRIPTION OF THE DRAWINGS

The above-mentioned and other features of the present disclosure will become more apparent and will be better understood by reference to the following description of embodiments of the present disclosure taken in conjunction with the accompanying drawings, wherein:

FIG. 10 is an assembly view of the frame module of FIG. 9;

FIG. 11 is a side elevation view of a leg of the projection screen assembly showing the leg including a T-shaped base module and a three frame modules coupled to the T-shaped base module;

FIG. 12 is a perspective view of the T-shaped base module;

FIG. 15 is a perspective view of the clamp of FIG. 13;

FIG. 16A is a cross-sectional view taken along line 16-16 of FIG. 13;

FIG. 20 is view similar to FIG. 1 showing the frame having a pair of—T-shaped base modules replacing the upper corner modules of the frame, another pair of T-shaped base modules coupled to the previously mentioned T-shaped base modules, frame modules coupled to the later-mentioned T-shaped base modules, and a drape (shown in phantom) supported by the frame to border the screen also supported by the frame;

FIG. 32 is a cross-sectional view of the drape support of FIG. 31;

FIG. 33 is a side elevation view of the drape support of FIG. 31;

FIG. 34 is a cross-sectional view showing a pair of loops coupled to a single post;

Figure 1:
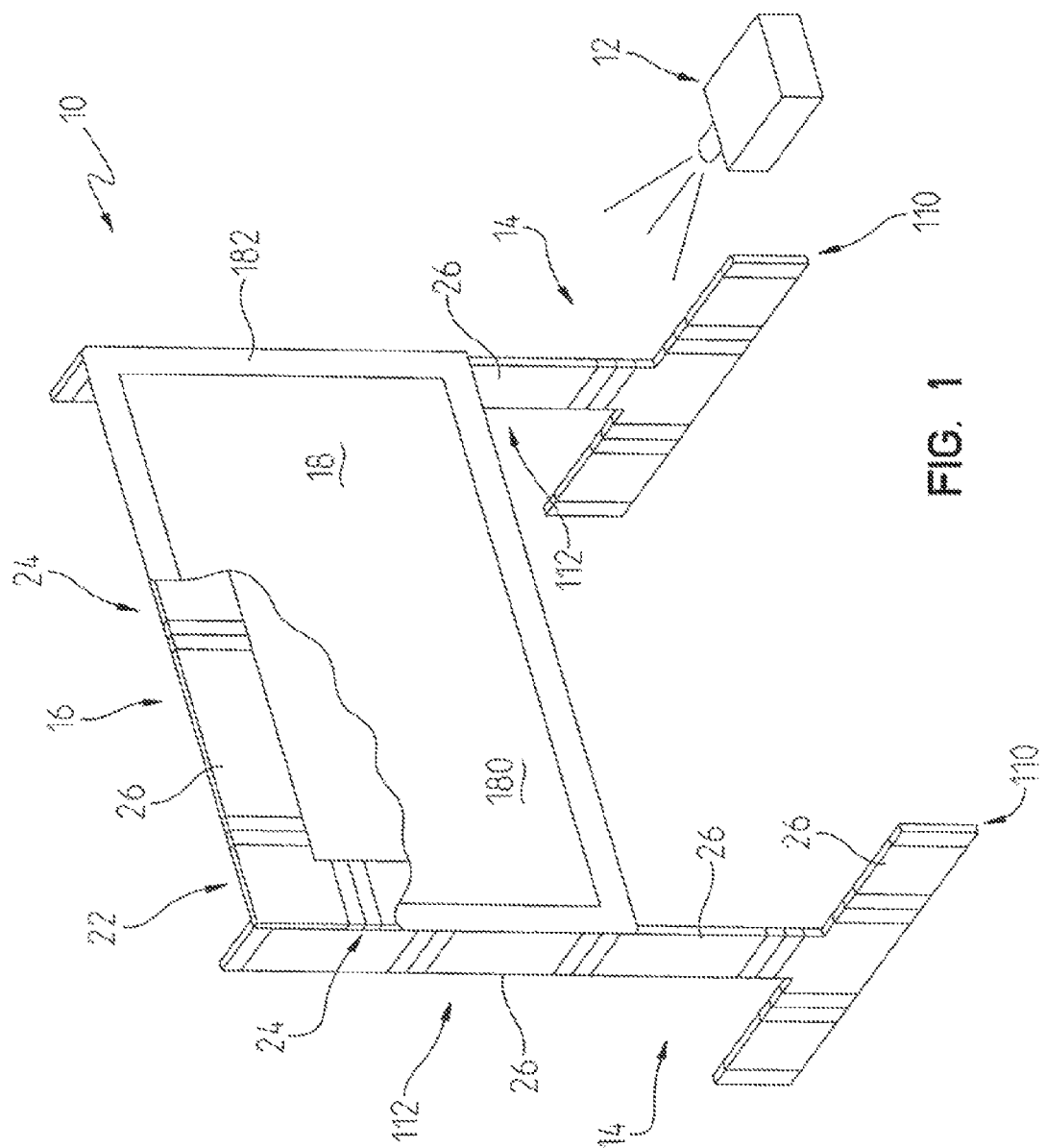
FIG. 1 is a diagrammatic view of a projection screen assembly showing the assembly including a pair of legs, a frame supported by the pair of legs, and a screen supported by the frame to display an image projected by a projector.

Corresponding reference characters indicate corresponding parts throughout the several views. Although the drawings represent embodiments of the present invention, the drawings are not necessarily to scale and certain features may be exaggerated in order to better illustrate and explain the present invention.

DESCRIPTION OF THE PREFERRED EMBODIMENTS OF THE INVENTION

The embodiments disclosed below are not intended to be exhaustive or limit the invention to the precise forms disclosed in the following detailed description. Rather, the embodiments are chosen and described so that others skilled in the art may utilize their teachings.

According to the present disclosure, a projection screen apparatus 10 is provided to display images projected by a projector 12. Typically, projection screen apparatus 10 includes a pair of legs 14 to support itself on a floor of a structure. According to alternative embodiments of the present disclosure, projection screen apparatus 10 may be suspended on a wall, ceiling, or other structure using fasteners, cables, or other suitable devices.

As shown in FIG. 1, projector 12 is positioned on the audience side of projection screen apparatus 10 to reflect back the images projected by projector 12 to an audience. According to alternative installations, projector 12 is positioned for a rear projection application on the back side of projection screen apparatus 10 so that images projected by projector 12 are displayed through projection screen apparatus 10 to the audience. In some installations, speakers (not shown) are positioned behind the projection screen apparatus 10 so that the sound is transmitted through projection screen apparatus 10.

Figure 3:
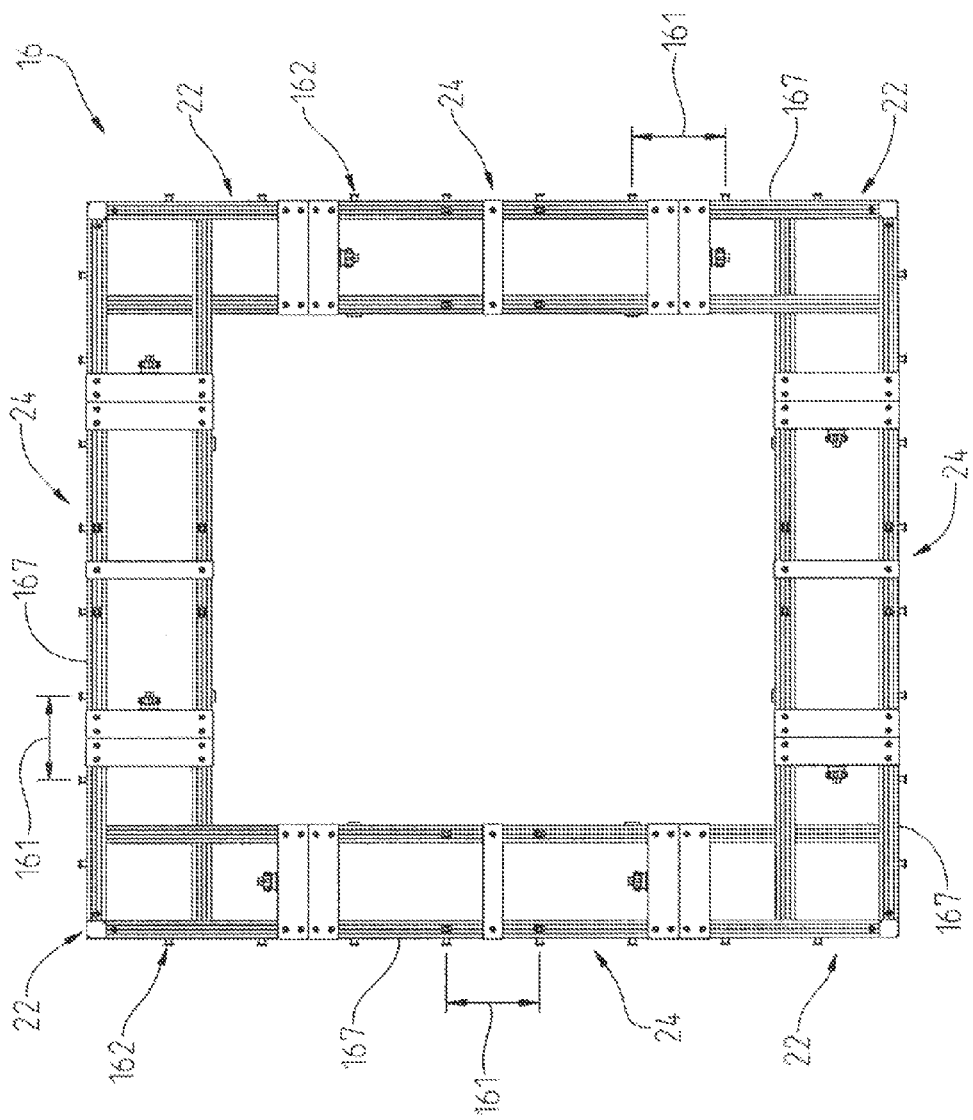
FIG. 3 is a side elevation view of a frame of the projection screen assembly of FIG. 1 showing four corner modules and four frame modules assembled to create a frame.

As shown in FIG. 1, projection screen apparatus 10 further includes a perimeter, projection screen frame 16 and a projection screen 18 tensioned on frame 16. Exemplary Frame 16 includes four corner frame modules 22 and four extended frame members 24 extending between corner modules 22 as shown in FIG. 3. Each frame member 24 is made of one or more frame modules 26. The length and number of frame modules 26 for each frame members 24 depends upon the size of screen 18 used in a particular application, such as a tradeshow.

Figure 2:
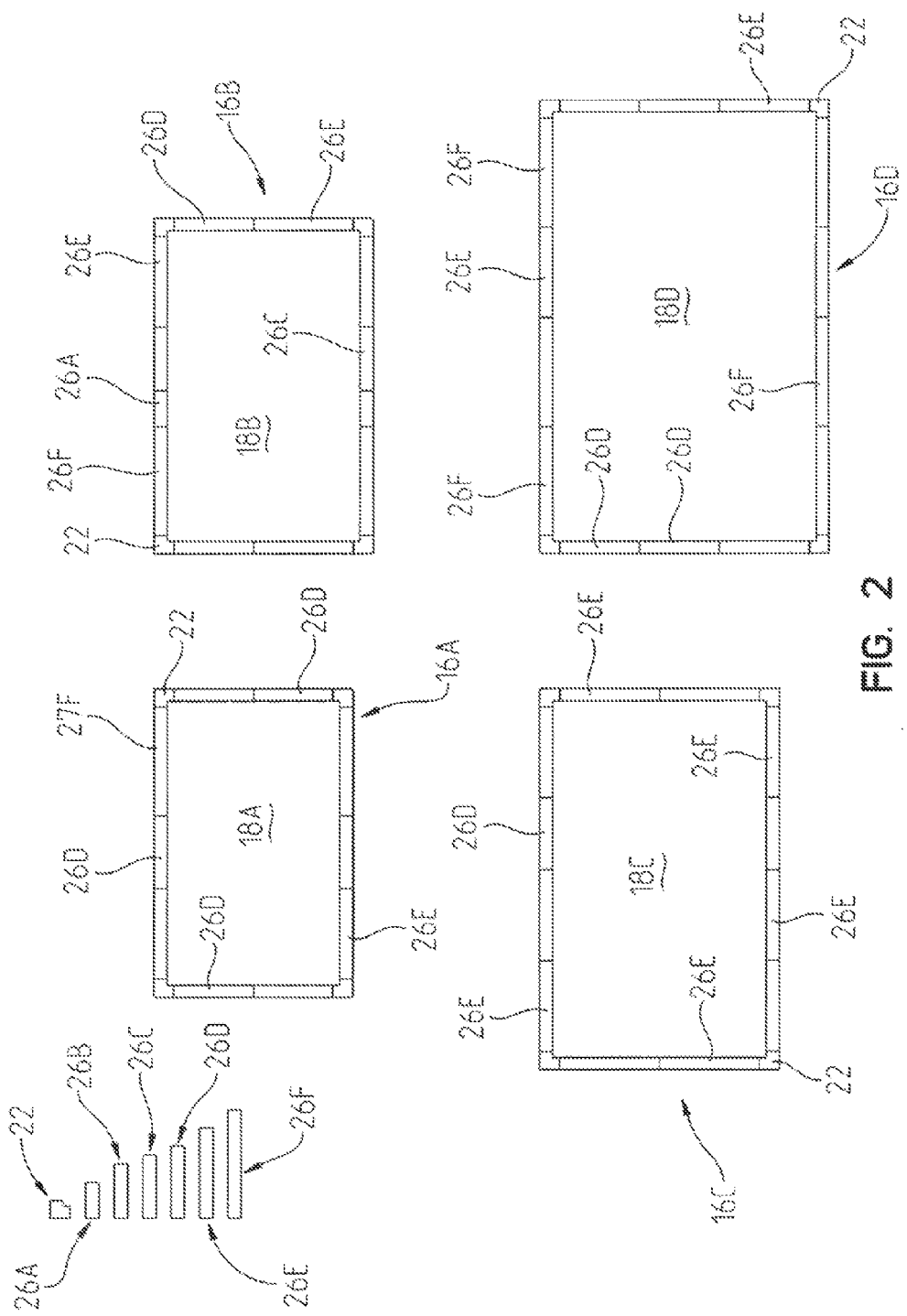
FIG. 2 is a view of a diagram showing a corner module and a plurality of frame modules and four frames assembled using various combinations of the corner modules and frame modules to create different sizes and formats of frames.

As shown in FIG. 2, frame modules 26 are provided in various sizes including modules 26A, 26B, 26C, 26D, 26E, and 26F. Other sizes and lengths of modules 26 may also be provided. Also shown diagrammatically in FIG. 2 are several frames 16 assembled using different sizes and numbers of frame modules 26 and various screens 18 (shown from the rear) supported by frames 16. Each frame 16 has a different height and width depending on which modules 26 were used. As an example, the below tables illustrates various combinations of frame modules 26 used to create different size frames 16A-16D shown in FIG. 2.

| Frame/module | 26A | 26B | 26C | 26D | 26E | 26F | 22 | Screen |
|---|---|---|---|---|---|---|---|---|
| 16A | — | — | — | 6 | 2 | 2 | 4 | 18A |
| 16B | 2 | — | 2 | 2 | 4 | 2 | 4 | 18B |
| 16C | — | — | — | 2 | 10 | — | 4 | 18C |
| 16D | — | — | — | 4 | 4 | 6 | 4 | 18D |
| Kit 242 min. | 2 | — | 2 | 4 | 10 | 6 | 4 | 18A, 18B, 18C, and 18D |
| Kit 242 min. + 1 | 3 | | 3 | 5 | 11 | 7 | 5 | 18A, 18B, 18C, and 18D |

Different combinations of frame modules 26 can be used to assemble taller/shorter and/or wider/narrower frames 16. For example in frame 16B, frame module 26B could replace frame module 26A to create a wider frame. As shown in the above table, a corresponding screen 18A, 18B, 18C, 18D is provided with each frame 16A, 16B, 16C, 16D. Similarly, if different modules 26 are provided to create different frame sizes, different sizes of screen 18 may be provided to correspond to the differently sized frame 16.

Figure 5:
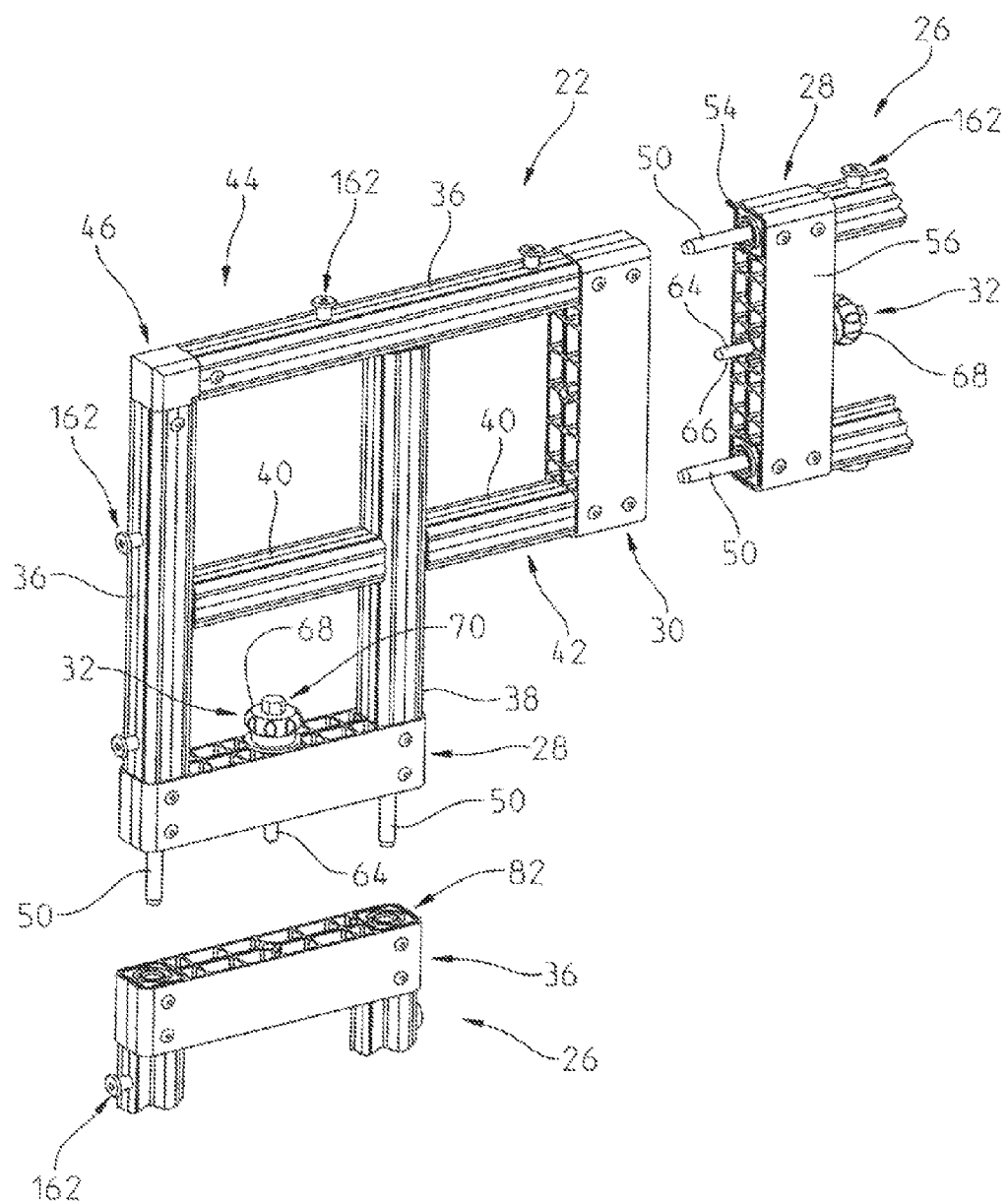
FIG. 5 is a view similar to FIG. 4 showing the two frame modules aligned with the corner module for coupling thereto.
Figure 6:
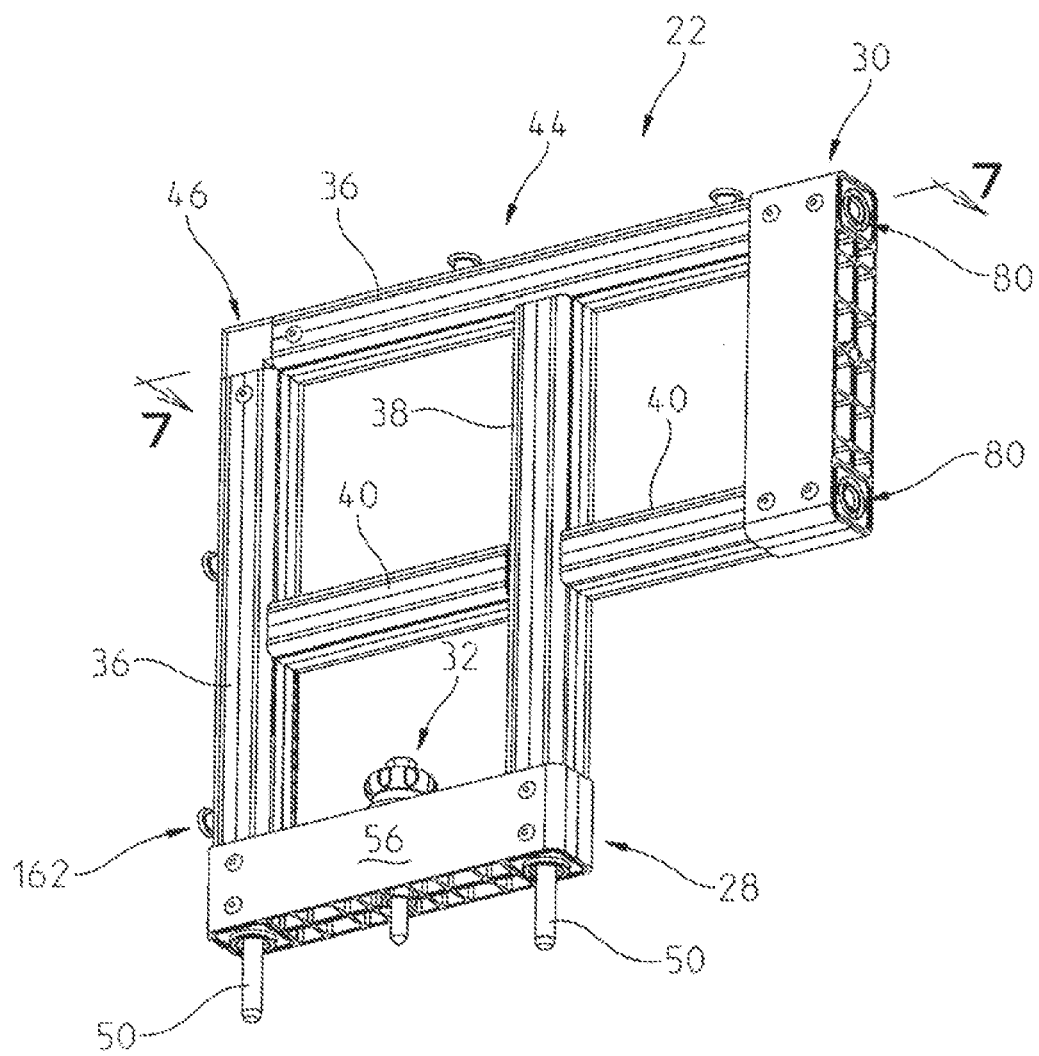
FIG. 6 is a perspective view of the corner module of FIG. 4.

Frame 16 is shown in FIG. 3 to include four corner modules 22 and four frame members 24 each including a single module 26 for simplicity of explanation. Normally, each frame member 24 will include multiple modules 26 as shown diagrammatically in FIG. 2. Each corner module 22 and each frame module 26 includes male portion 28 and female portion 30 as shown in FIG. 5. Each male portion 28 is configured to couple to a respective female portion 30. For example as shown in FIG. 5, male portion 28 of corner module 22 is configured to couple to a female portion 30 of an adjacent frame module 26 and female portion 30 of corner module 22 is configured to couple to a male portion 28 of an adjacent frame module 26. Similarly, male portion 28 of frame module 26 is configured to couple to a female portion 30 of an adjacent corner module 22 (or frame module 26) and female portion 30 of frame module 26 is configured to couple to a male portion 28 of an adjacent corner module 22 (or frame module 26).

Figure 4:
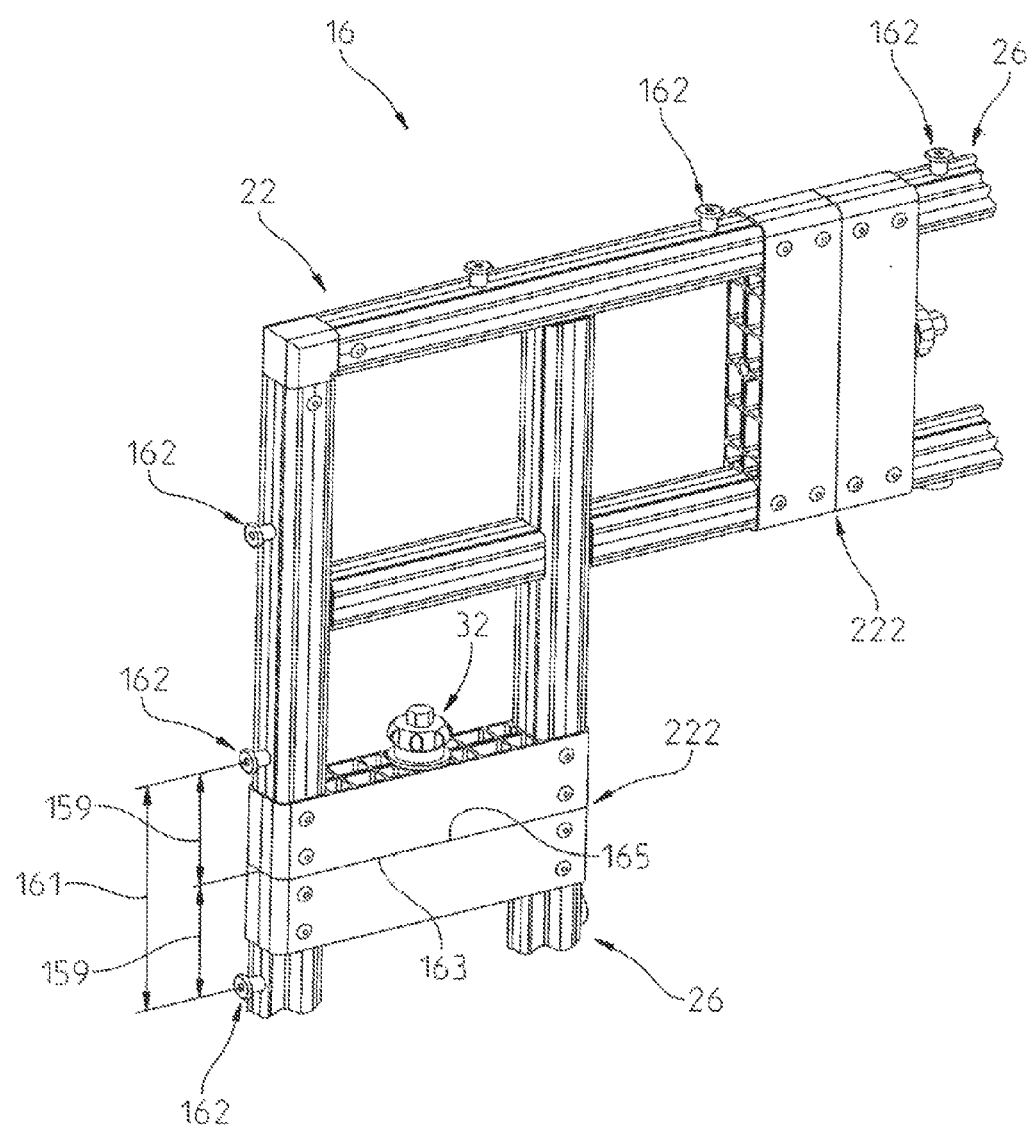
FIG. 4 is a perspective view of a corner module of FIG. 3 and two frame modules coupled to the corner module.

Each male portion 28 includes a threaded assembly or coupler 32 that threads into or is coupled to a nut or coupler 34 of female portion 30. Once coupled together by couplers 32, 34, corner modules 22 and frame modules 26 create substantially rigid frame 16 as shown in FIGS. 3 and 4.

As shown in FIGS. 5-8, each corner module 22 includes a pair of outer perimeter tubes 36, inner perimeter tube 38, and inner perimeter tube segments 40 that cooperate to define segmented, inner perimeter tube 42, all of which are welded together to form tubular frame 44. Corner module 22 further includes a cast, corner 46 that is inserted into respective outer perimeter tubes 36, preferably before welding.

Figure 7:
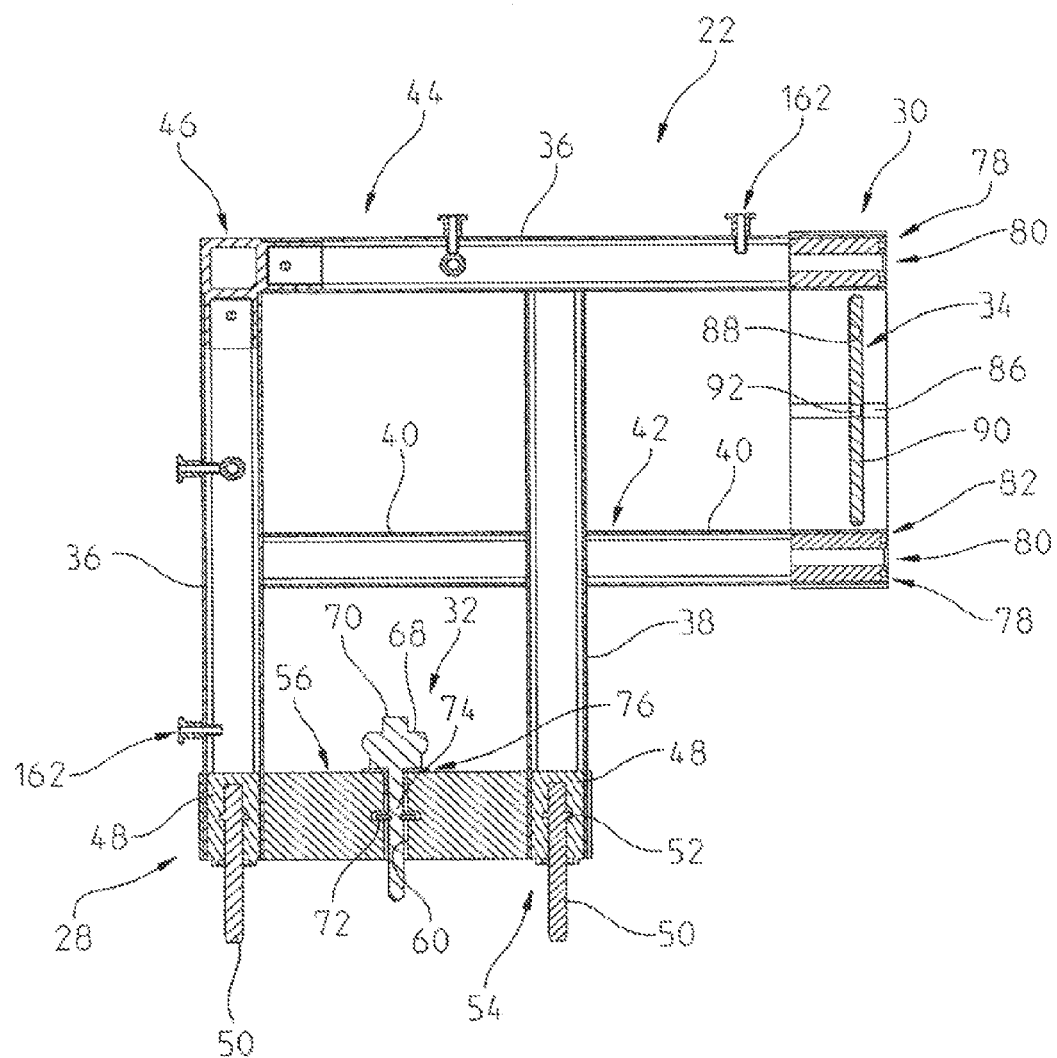
FIG. 7 is a cross-sectional view of the corner module of FIG. 4 taken along line 7-7 of FIG. 6.

Each male portion 28 includes a pair of inserts 48 sized to fit within the ends of respective tubes 36, 38 and a pair of posts 50 received in inserts 48. Inserts 48 are preferably molded of plastic and posts 50 are preferably steel and over-molded into inserts 48 during the molding process. As shown in FIG. 7, each post 50 includes a shoulder 52 that prevents withdrawal of posts 50 from respective inserts 48. Each insert 48 includes a raised shoulder or rim 54 that mates with female portion 30 as discussed below.

Figure 8:
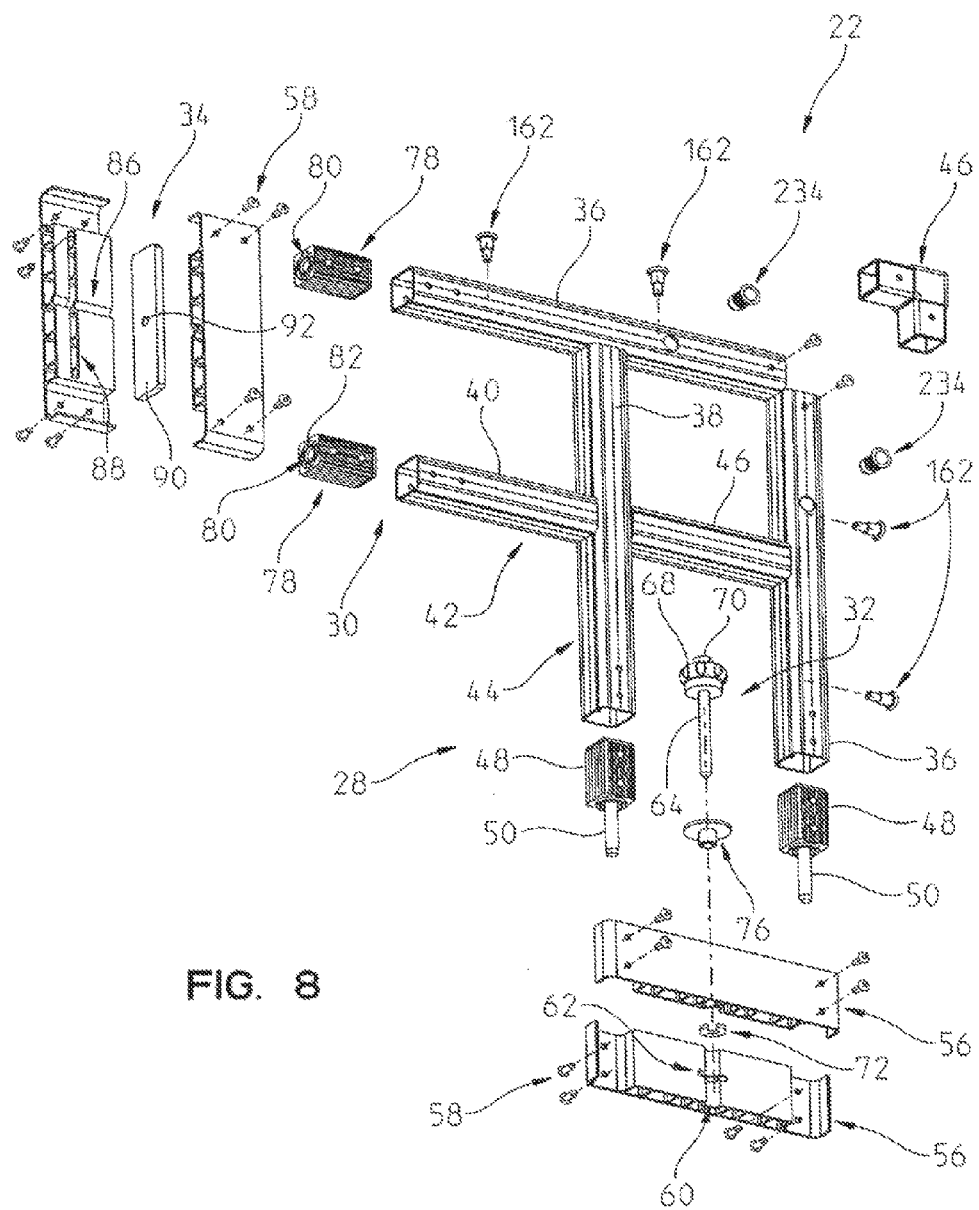
FIG. 8 is an assembly view of the corner module of FIG. 4.
Figure 9:
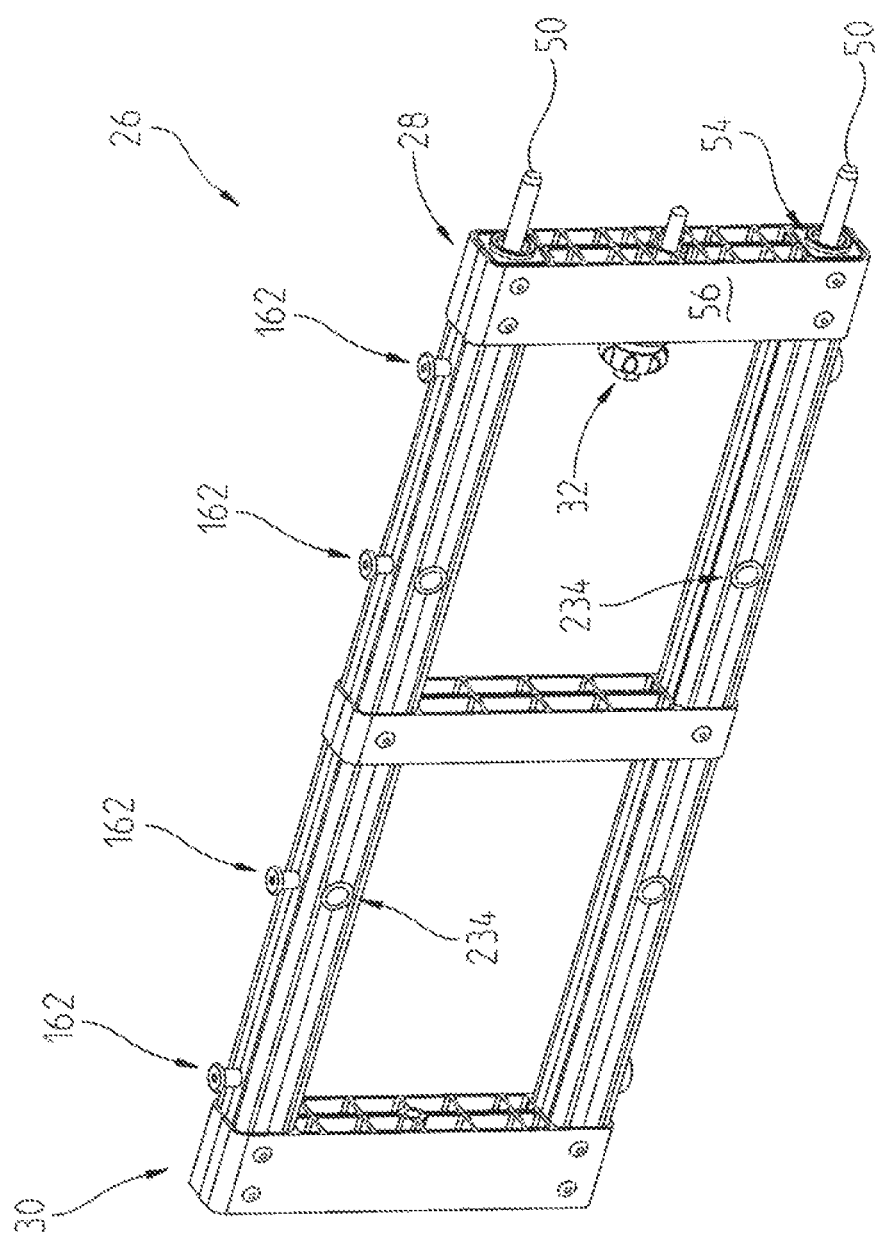
FIG. 9 is a perspective view of a frame module of FIG. 4.
Figure 14:
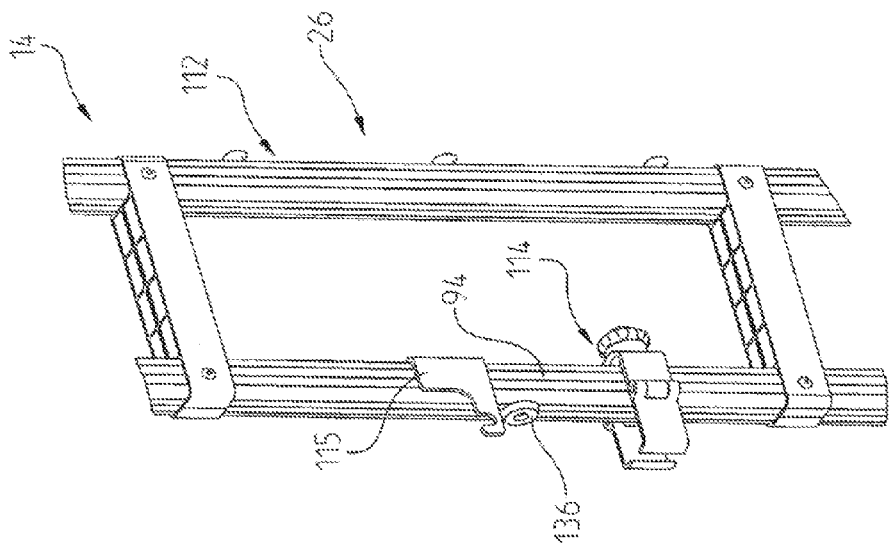
FIG. 14 is a view similar to FIG. 13 with the frame removed for clarity.

Each male portion 28 further includes a pair of split collars or plates 56 fastened to tubes 36, 38 with fasteners 58 that extend through tubes 36, 38 into inserts 48. Collars 56 wrap around tubes 36, 38 to provide a relatively flat profile. Collars 56 further include channel 60 and groove 62 that receive coupler 32 as shown in FIGS. 7 and 8.

Coupler 32 includes a threaded post or bolt 64 having a threaded shank 66, knob 68, and hex head 70. Coupler 32 further includes clip 72 that fits within groove 74 in shank 66 and collar 76. Clip 72 is received in groove 62 and prevents shank 66 from translating up or down collars 56 during rotation of shank 66 as described below. Collar 76 receives shank 66 and distributes the load applied by threaded post 64 during coupling of coupler 32 of male portion 28 with coupler 34 of female portion 30 as described below.

Each female portion 30 includes a pair of inserts 78 sized to fit within the ends of respective tubes 36, 42 and defining a pair of apertures 80 sized to receive posts 50 of male portions 28. Inserts 78 are preferably molded of plastic and includes an annular channel 82 that mates shoulder 52 of inserts 48 of male portions 28.

Each female portion 30 further includes a pair of split collars or plates 84 fastened to tubes 36, 42 with fasteners 58 that extend through tubes 36, 42 into inserts 78. Collars 84 wrap around tubes 36, 42 to provide a relatively flat profile. Collars 84 further include channel 86 and groove 88 that receive coupler 32 as shown in FIGS. 7 and 8.

Coupler 34 includes plate 90 having a threaded aperture 92 that receives threaded shank 66 of post 64 of coupler 32. Plate 90 is positioned in groove 88 and receives shank 66 and distributes the load applied by threaded post 64 during coupling of coupler 32 of male portion 28 with coupler 34 of female portion 30.

Figure 29:
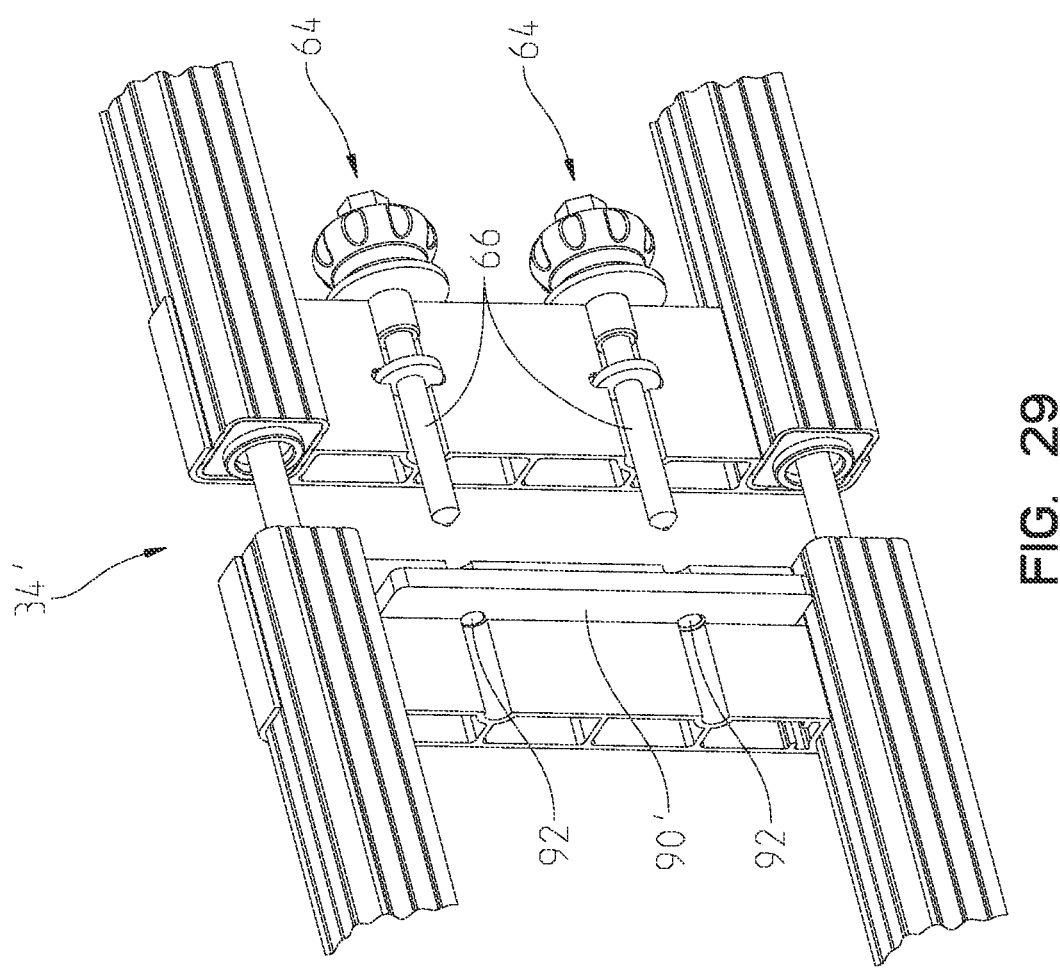
FIG. 29 is a perspective view of an the opposite ends of an alternative embodiment frame module.

An alternative embodiment coupler 34' is shown in FIG. 29. Coupler 34 is similar to coupler 34, but includes two bolts 64. Plate 90' includes a pair of threaded apertures 92 that receive threaded shanks 66 of bolts 64.

Similar to corner module 22, frame modules 26 each include tubes 94. Frame modules 26 further includes inserts 48, 78 inserted within tubes 94 and collars 56, 84 supporting couplers 32, 34. In addition to supporting respective couplers 32, 34, collars 56, 84 also support tubes 94 at a predetermined position. Each module 26 further includes a middle pair of collars or plates 96 that support tubes 94 at the predetermined position.

During assembly of frame 16, posts 50 of male portions 28 are aligned with apertures 80 of female portions 30 and inserted therein. With this alignment, threaded shank 66 of coupler 32 is aligned with threaded aperture 92 in plate 90 of coupler 34. An assembler turns post 64 by rotating knob 68 by hand or otherwise or uses a tool on hex head 70. As post 64 turns, shank 66 is drawn further into plate 90, which draws male and female portions 28, 30 together until they are firmly locked as show in FIG. 4.

In addition to forming portions of frame 16, frame modules 26 may also be used to form portions of legs 14 as shown in FIGS. 1 and 11. Legs 14 include a base module 98 and one or more frame modules 26. Each base module 98 includes a plurality of tubes 100, 102 and tube segments 104, 106 that cooperate to define a segmented tube 108. Tubes 100, 102, 108 are welded together to form tubular frame 109. Base module 98 includes male coupler 32 and a pair of female couplers 34. As shown in FIGS. 1 and 11, one or more frame modules 26 are coupled to base module 98 at female couplers 34 to form horizontal base 110 of legs 14 and one or more frame modules 26 are coupled to base module 98 at male couplers 32 to form vertical uprights 112 of legs 14.

Base modules 98 may also replace corner modules 22 to create a frame 16 that supports drape 99. Drape 99 has an opening that allows screen 18 to be seen by an audience, but otherwise covers border 182 of screen 18 and most of frame 16. Additional base modules 98 are coupled to the base modules 98 that replaced upper corner modules 22. Frame modules 26 are coupled to these upper-most base modules 98 to create a cross bar 101 to support drape 99. Stiffening bars 218, 219, discussed below, can be used to couple frame modules between the upper-most base modules 98 that have a female-to-female joint 221 there-between.

Figure 13:
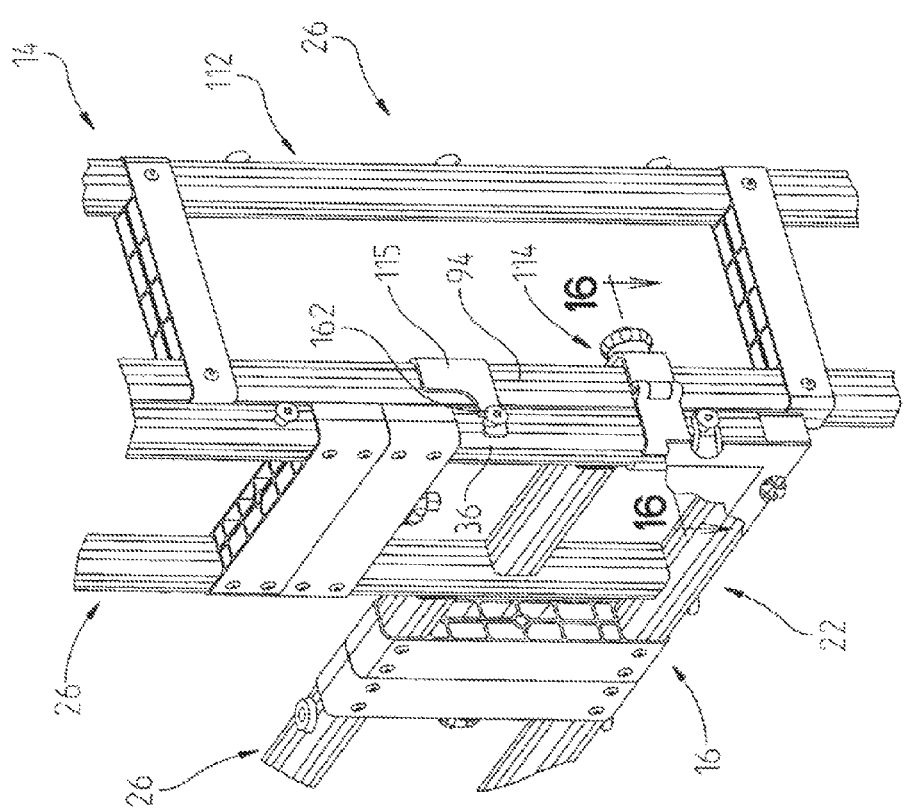
FIG. 13 is a perspective view of a portion of the leg of FIG. 11 and the frame of FIG. 3 showing the frame coupled to the leg with a clamp and a portion of the screen positioned over the clamp.

Frame 16 is coupled to uprights 112 of legs 14 as shown in FIG. 13 by one or more clamps or connectors 114 and hook 115. Clamps 114 are preferably provided at a lower portion of frame 16, as shown in FIG. 13, and upper portion of frame 16. Clamps 114 wrap around either tubes 36 of corner modules 22, as shown in FIG. 13, or tubes 94 of frame modules 26 to couple frame 16 to uprights 112. Optional hook 115 supports post 162 on frame 16.

As shown in FIG. 16A, clamp 114 includes a U-shaped base 116, and a pair of L-shaped arms 118 pivotally attached to base 116 by a pair of hinge pins 120. Clamp 114 further includes drive 122 having threaded post, bolt, or compression members 124 having a threaded shank 126, knob 128, and hex head 130 and rubber bumper 132 coupled to an end of threaded shank 126.

During coupling of frame 16 to legs 14, L-shaped arms 118 wrap around tube 36 of corner module 22 (or tube 94 of frame module 26) and U-shaped base 116 receives tube 94 of frame module 26. The assembler rotates knob 128 so threaded shank 126 feeds through threaded aperture 134 of base 116, which drives rubber bumper 132 into tube 94 and draws L-shaped arms 118 into tube 36, causing tube 36 of corner module 22 to be drawn or compressed together with tube 94 of frame module 26.

Rubber pad or resilient feet 136 are provided on one or more sides of tubes 94 of frame modules 26. As tube 36 of corner module 22 is drawn together with tube 94 of frame modules 26, rubber feet 136 are compressed to create grip between tubes 36, 94. As shown in FIG. 11, rubber feet 136 also support legs 14 on the floor or ground to provide clearance for collars 56, 84. When not used on legs 14, feet 136 of side frame modules used to construct projection screen frame 16 are spaced apart from the ground and are coupled to an inward facing surface of projection screen frame 16. Similarly, when not used on frame members 24 for projection screen frame 16, posts 162, which form projection screen frame connectors, are spaced apart from connectors of projection screen 18, such as loops 164.

When leg 14 is coupled to projection screen frame 14, identical frame members, such as frame modules 26, may be oriented in different planes. For example, a frame module 26 used to construct projection screen frame 16 may be substantially horizontal or vertical and parallel to screen 18 and an identical frame module 26 may be normal to screen 18.

Figure 16B:
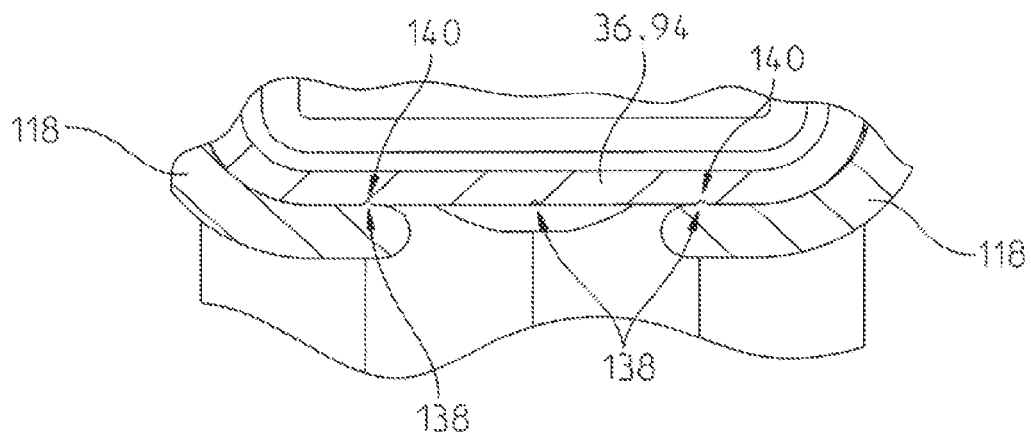
FIG. 16B is an enlarged view of a portion of FIG. 16A.

As shown in FIG. 16B, tubes 36, 94 and the other tubes, described herein, include a plurality of longitudinally extending grooves or recesses 138 formed in an exterior surface of projection screen frame 16 and L-shaped arms 118 include teeth 140 sized to fit within grooves 138. As L-shaped arms 118 are drawn toward tube 36 by drive 122, teeth 140 are positioned further in grooves 138. Teeth 140 resist L-shaped arms 118 from being pulled away from tubes 36 when drive 122 is compressing tubes 36, 94 together.

Figure 26:
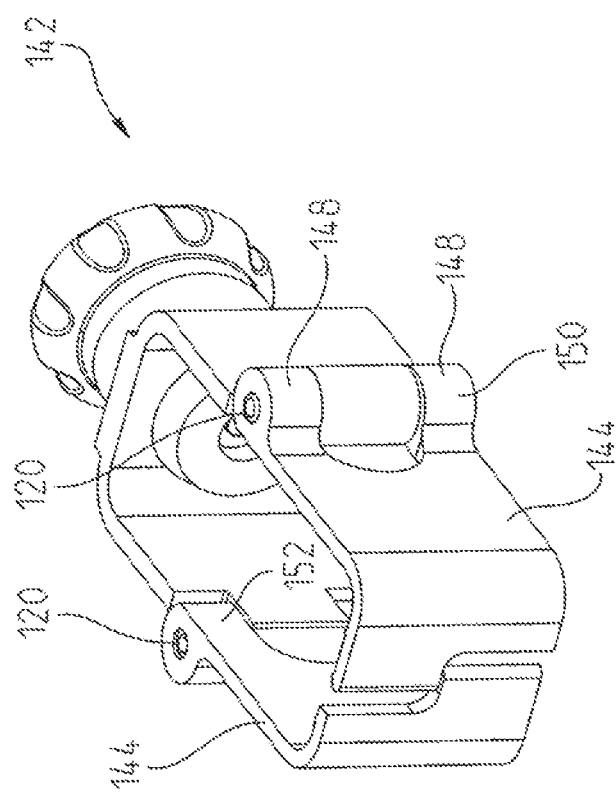
FIG. 26 is a perspective view of another damp.
Figure 27:
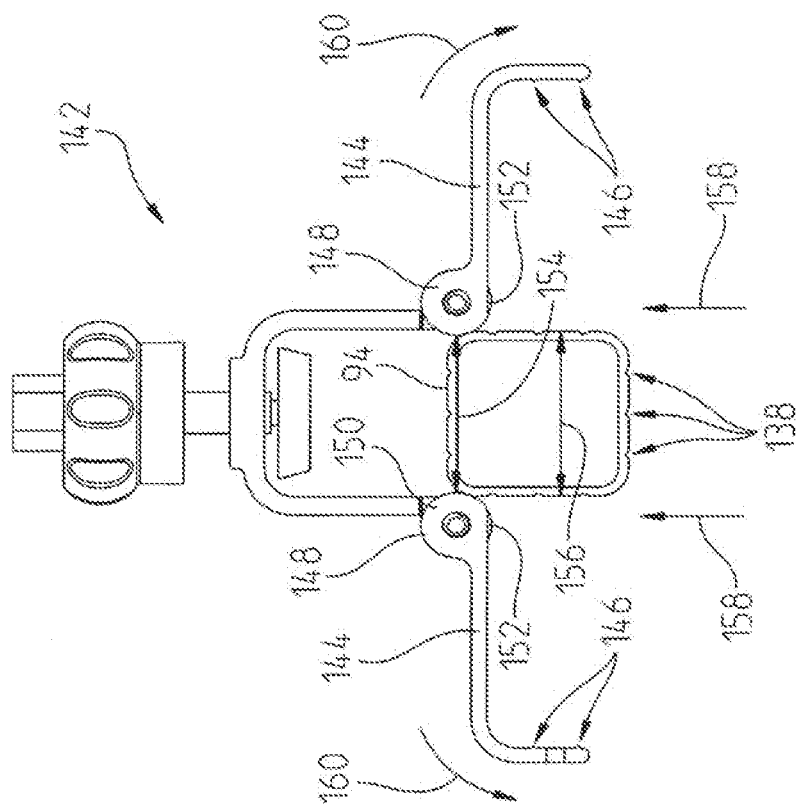
FIG. 27 is a top plan view of the damp of FIG. 26 positioned adjacent to a frame member with arms of the damp in an open position.
Figure 28:
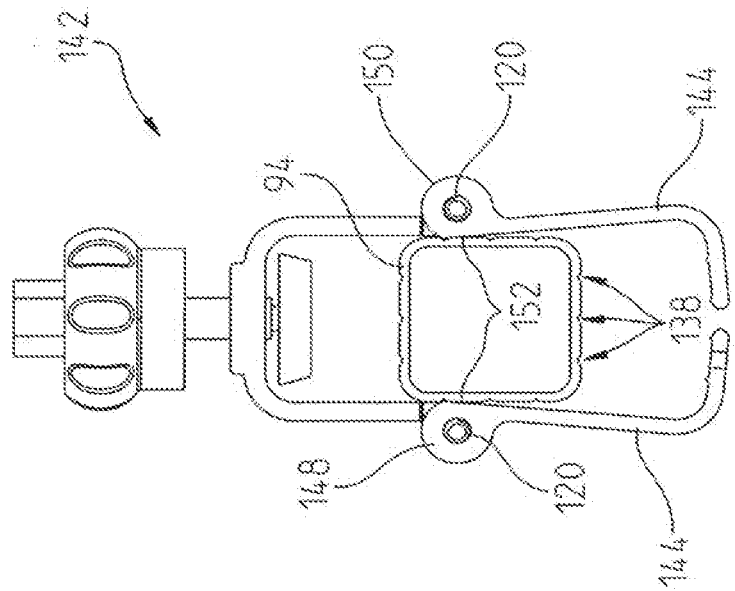
FIG. 28 is a view similar to FIG. 27 showing the arms swinging toward a dosed position as the damp is pushed over the frame member.

Alternative embodiment damp 142 is shown in FIGS. 26-28. Clamp 142 is similar to damp 114 discussed above, but includes overlapping, L-shaped arms 144 that each have a pair of teeth 146 to fit into grooves 138 of tubes 36.

To clamp tube 36 to tube 94 as shown in FIG. 13, tubes 36, 94 are aligned as shown in FIG. 13. Next, respective damps 114, 142 in an open position, as shown in FIG. 27, are positioned behind tube 94. U-shaped base 116 is then inserted over tube 94 to a position as shown in FIGS. 13 and 16 so that arms 118, 144 of respective damps 114, 142 wrap around tube 36.

During seating of damps 114, 142 on tubes 36, 94, respective arms 118, 144 swing from an open position as shown in FIG. 27 for damp 142, to an partially dosed position as shown in FIG. 28, and to a dosed position as shown in FIG. 16 for damp 114. This swinging results from placement of clamps 114, 142 over tube 94.

As with damp 114, clamp 142 includes collars 148 that receive pins 120. Collars 148 have a substantially circular surface 150 with a center of curvature located at the center of pins 120. Collars 148 further include a substantially flat surface 152 that is positioned adjacent to tube 94 when clamps 114, 142 are fully seated on tubes 94 as shown in FIG. 16 for clamp 114.

When arms 144 of clamp 142 are in the open position, as shown in FIG. 27, circular surfaces 150 of collars 148 are separated by distance 154 that is less than width 156 of tube 94, which creates interference between collars 148 and tube 94 during insertion of clamps 114, 142 over tube 94. This interference creates frictional force between circular surfaces 150 of collars 148 and tube 94 in direction 158 that causes collars 148 and the remainder of respective arms 118, 144 of clamps 114, 142 to rotate in direction 160 as base 116 is slide over tube 94 to an intermediate position, as shown in FIG. 28, and to a fully closed position, as shown in FIGS. 13-16 for clamp 114 and FIG. 26 for clamp 142. Eventually, arms 118, 144 of respective clamps 114, 142 are fully rotated so that flat surfaces 152 of collars 148 are substantially parallel, which reduces or eliminates the interference and resulting friction.

When tube 36 is aligned with tube 94, as shown in FIGS. 13 and 16, and damp 114 (or damp 142) is inserted over tube 94, arms 118 (or 144) automatically wrap around rube 36. As a result, arms 118, 144 of respective damps 114, 142 are automatically positioned around tube 36 so that drive 122 can be rotated to lock teeth 146 into grooves 138 of tube 36. To uncouple frame 16 from legs 14, drives 122 of respective damps 114, 142 are rotated in the opposite direction and clamps 114, 142 are pulled off tubes 36, 94.

Typically before frame 16 is attached to legs 14, projection screen 18 is secured to frame 16. According to the preferred embodiment of the present disclosure, projection screen 18 is coupled to frame 16 using a plurality of studs or post 162 on frame 16 and loops 164 on screen 18. As shown in FIG. 3, posts 162 are provide on an outwardly facing perimeter surface 167 of frame 16. Posts 162 may also be provided on other surfaces of frame 16. Posts 162 are a preferred connector of projection screen frame 16 that connect with loops 164 to couple screen 18 to frame 16. According to alternative embodiments of the present disclosure, other connector may be provided, such as snaps, velcro, or other connectors to couple screen 18 to frame 16.

Posts 162 are preferably coupled to outward facing perimeter surface 167 of projection screen frame 16. However, posts 162 and the other frame connectors disclosed herein may be coupled to other surfaces of projection screen frame 16, such as the forward facing surface, the inward facing surface, or the reward facing surface.

Figure 17:
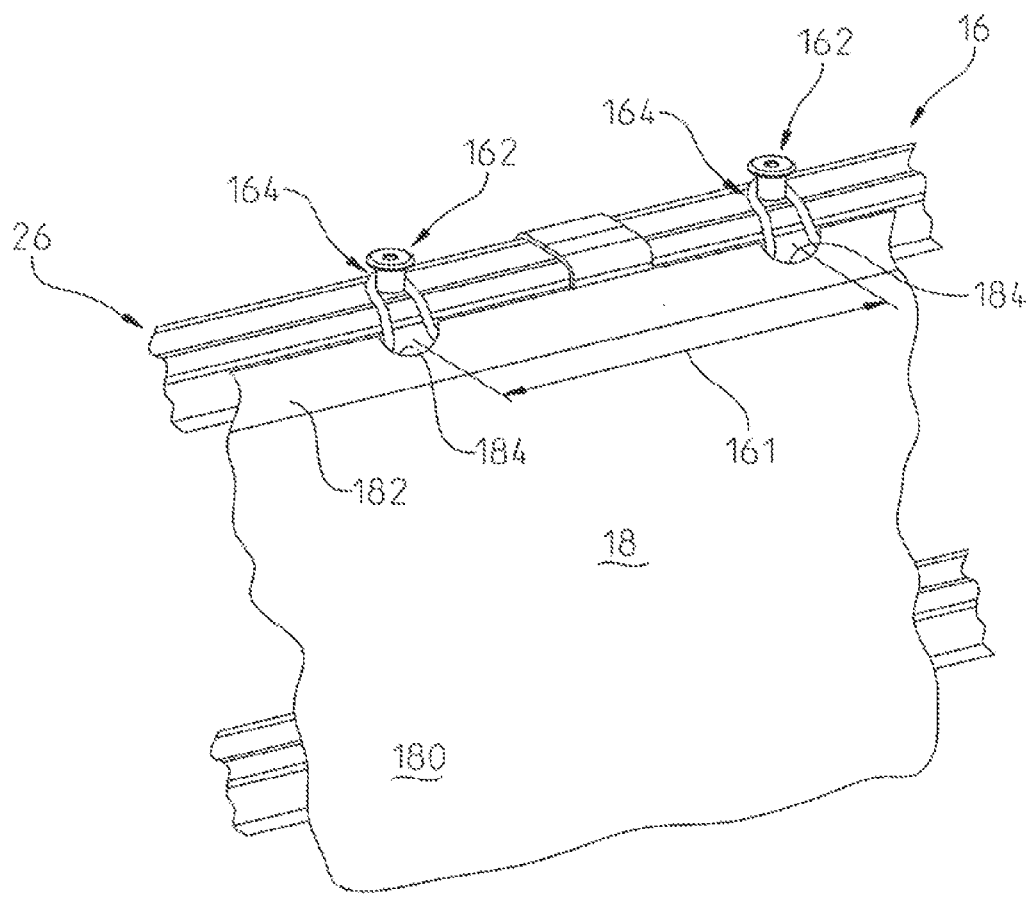
FIG. 17 is a perspective view of the frame and screen showing the screen coupled to the frame with a pair of studs and elastic loops.

As shown in FIG. 3, posts 162 are provided at equal increments 161 around frame 16 after corner modules 22 and frame modules 26 are assembled. Loops 164 are also provided at these increments 161 on the outer perimeter of screen 18 as shown in FIG. 17. According to the preferred embodiment of the present disclosure, posts 162 and loops 164 are provided at increments 161 of six inches.

To maintain the equal increments, posts 162 adjacent to ends 163, 165 of modules 26 and corner module 22 are positioned half the increment length 161 from the respective ends 163, 165 as shown in FIG. 4. For example, the preferred increment 161 is six inches. As a result, the preferred spacing 159 of posts 162 adjacent to ends 163, 165 is three inches from respective ends 163, 165 so that these adjacent posts 162 are six inches apart from each other.

Further, the length of modules 26 and corner modules 22 are preferably multiplies of the preferred increment length. For example, as stated above, the preferred increment length is six inches and corner modules 22 and frame modules 26A, 26B, 26C, 26D, 26E, and 26F are 12, 24, 36, 42, 48, 60, and 72 inches in length, respectively, each of which is a multiple of six inches. Put another way, the preferred increment length (6 inches) is a factor of each of the lengths of corner modules 22 and frame modules 26A, 26B, 26C, 26D, 26E, and 26F. As a result, the length of module 22, 26A, 26B, 26C, 26D, 26E, and 26F is a multiple of the spacing between posts 162. The sum of the distance 159 between one post 162 to joint 222 (ex. three inches) and the distance 159 between the other post 162 adjacent to that joint 222 to joint 222 (ex. three inches) is equal to the incremental distance 161 between all posts 162 (ex. six inches). The preferred distance between posts 162 (adjacent to joint 222) and joint 222 is one-half the distance between posts 162 (ex. 3 inches is one half of six inches). According to alternative embodiments, the distance between the posts 162 (adjacent to joint 222) and joint 222 are not equal. For example, the distance between one stud to joint 222 is two inches and the distance between the other post 162 and joint 222 is four inches to create a six inch distance between posts 162. According to alternative embodiments of the present disclosure, the spacing of posts 162 are not at the same increment and the lengths of corner modules 22 and frame modules 26A, 26B, 26C, 26D, 26E, and 26F are not multiples of a stud or other coupler spacing.

According to the preferred embodiment of the present disclosure, posts 162 are shoulder rivets as shown in FIG. 16A that have an enlarged head 166 and narrower shank 168. Tenons 170 of posts 162 are inserted into pre-drilled holes in the various tubes 36, 38, 42, 94 and expanded to hold posts 162 on tubes 36, 38, 42, 94. According to alternative embodiments, other stud configurations may be provided, such as studs without heads. As shown in FIG. 34, shoulder rivets 162 preferably have a central aperture 169 to facilitate expansion of an inner end thereof.

Figure 18:
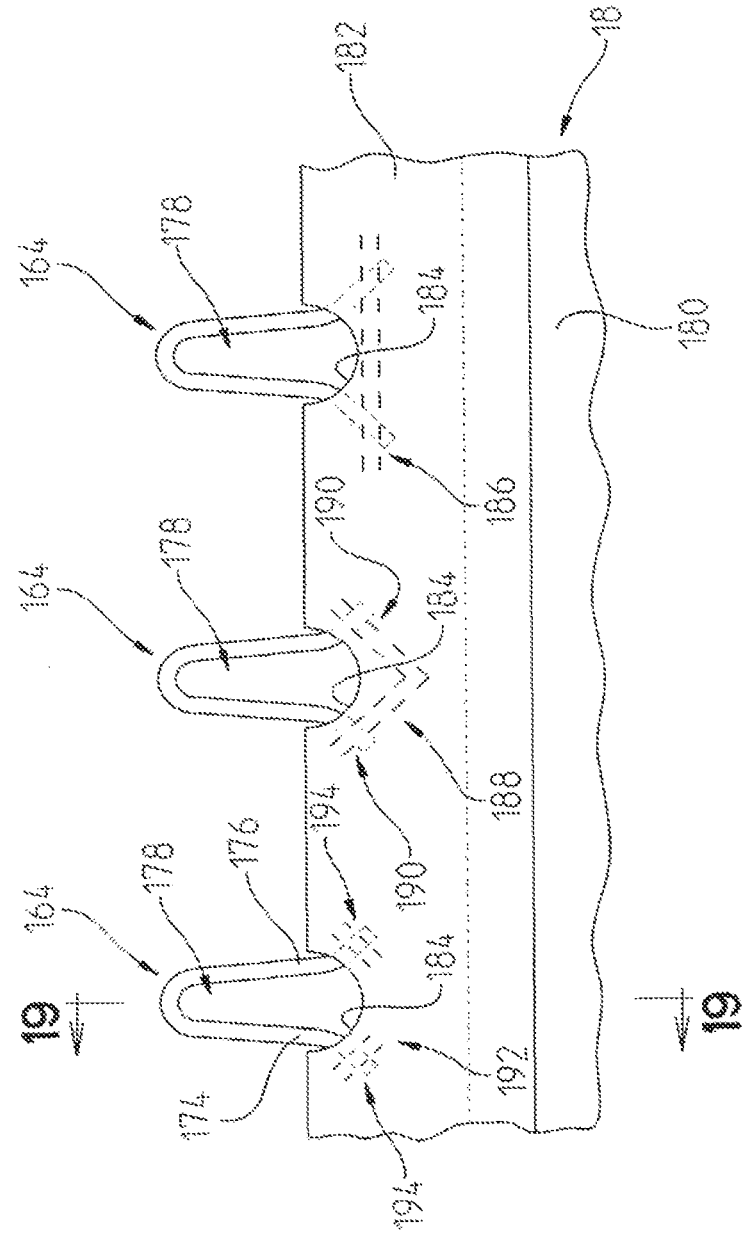
FIG. 18 is a side elevation view of the screen and three elastic loops coupled to the screen with three stitch patterns.

According to the preferred embodiment, loops 164 are preferably elastic bands, such as bungee cords. According to alternative embodiments, loops 164 may be made of other materials, such as non-elastic cords, ropes, lines, etc. As shown in FIG. 18, loops 164 have first end 174 coupled to screen 18 and a second end 176 coupled to screen 18 so that a combination of loop 164 and screen 18 cooperate to define a whole aperture 178. According to other embodiments, loop 164 may have a rigid hook (not shown) so that a whole aperture is not defined. Loops 164 preferably have pull tabs 169 to assist in pulling loops 164 over posts 162 as described below.

When coupled to posts 162, portions of loops 164 are positioned forward of frame 16 and portions are positioned outward of perimeter surface 167. When posts 162 or other frame connectors are provided in locations other than perimeter surface 167, portions of loops 164 may be located in other locations, such as rearward of frame 16 or inward of components of frame modules 22, 26. When wrapped around posts 162, loops 164 apply force to posts 162 in a direction normal to the viewing surface of projection screen 18. Loops 164 also apply an outward force to projection screen 18 to provide tension thereto.

Figure 19:
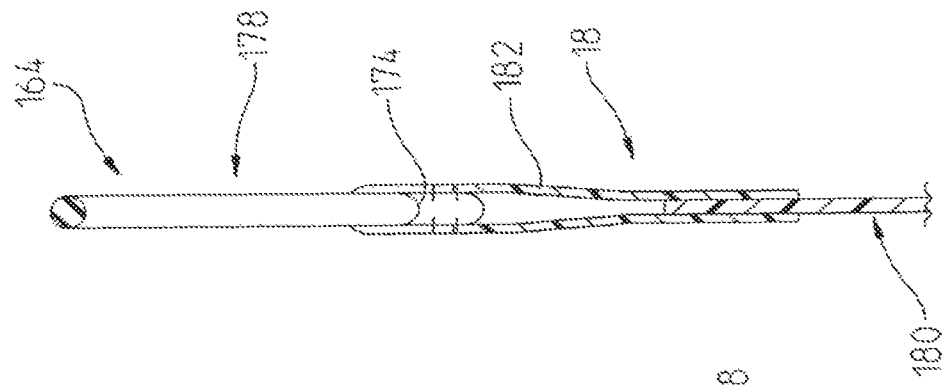
FIG. 19 is a cross-sectional view taken along line 19-19 of FIG. 18.

As shown in FIG. 19, screen 18 includes a viewing surface 180 and a border 182 that extends around the four edges of viewing surface 180 as shown in FIG. 1. Viewing surface 180 and border 182 are preferably made of a woven or non-woven fabric, such as vinyl sheet with or without reinforcement. Border 182 is folded over each side of viewing surface 180 and sewn or other otherwise coupled to viewing surface 180 at the overlap therebetween. As shown in FIG. 17, border 182 includes a plurality of notches or openings 184 through which loops 164 extend. First and second ends 174, 176 of loops 164 are sewn or otherwise coupled to border 182 resulting in loops 164 being permanently coupled to the remainder of screen 18. FIG. 18 illustrates several methods of sewing loop 164 to border 182. From left to right, stitching 186 is parallel to border 182, stitching 188 is V-shaped with two segments 190 at forty-five degree angles to border 182, and stitching 192 includes two separated segments 194 that are at forty-five degree angles from border 182. Other stitching configurations may also be provided.

Figure 24:
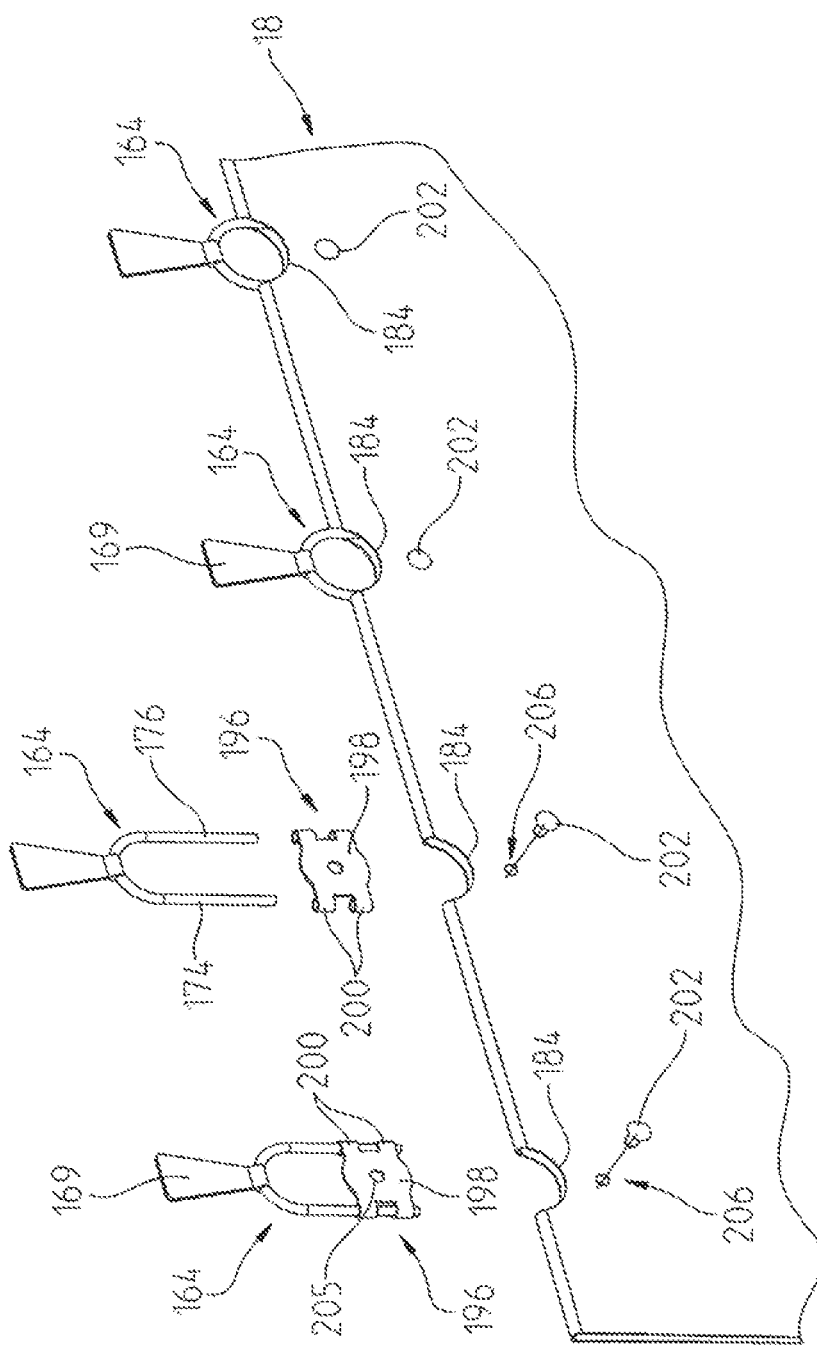
FIG. 24 is a perspective view showing a plate and elastic cord provided to couple the screen to the studs mounted on the frame.

As shown in FIG. 24, loop 164 may also be coupled to border 182 with plate 196 sandwiched between folds of border 182. Plate 196 includes a substantially circular body 198 and four fingers 200. Initially, plate 196 is substantially flat. First and second ends 174, 176 are placed over fingers 200, which are rolled over first and second ends 174, 176 to secure loop 164 to plate 196.

To couple loop 164 and plate 196 to border 182, plate 196 is positioned between folds of border 182 with loop 164 extending through opening 184 of border 182. Rivet 202 is inserted through respective openings 205, 206 of plate 196 and border 182 and rivet 202 is expanded in a customary manner to secure plate 196 to border 182, as shown in the two right-most examples in FIG. 24. Plate is preferably made of metal, but may be made of other materials.

Figure 25:
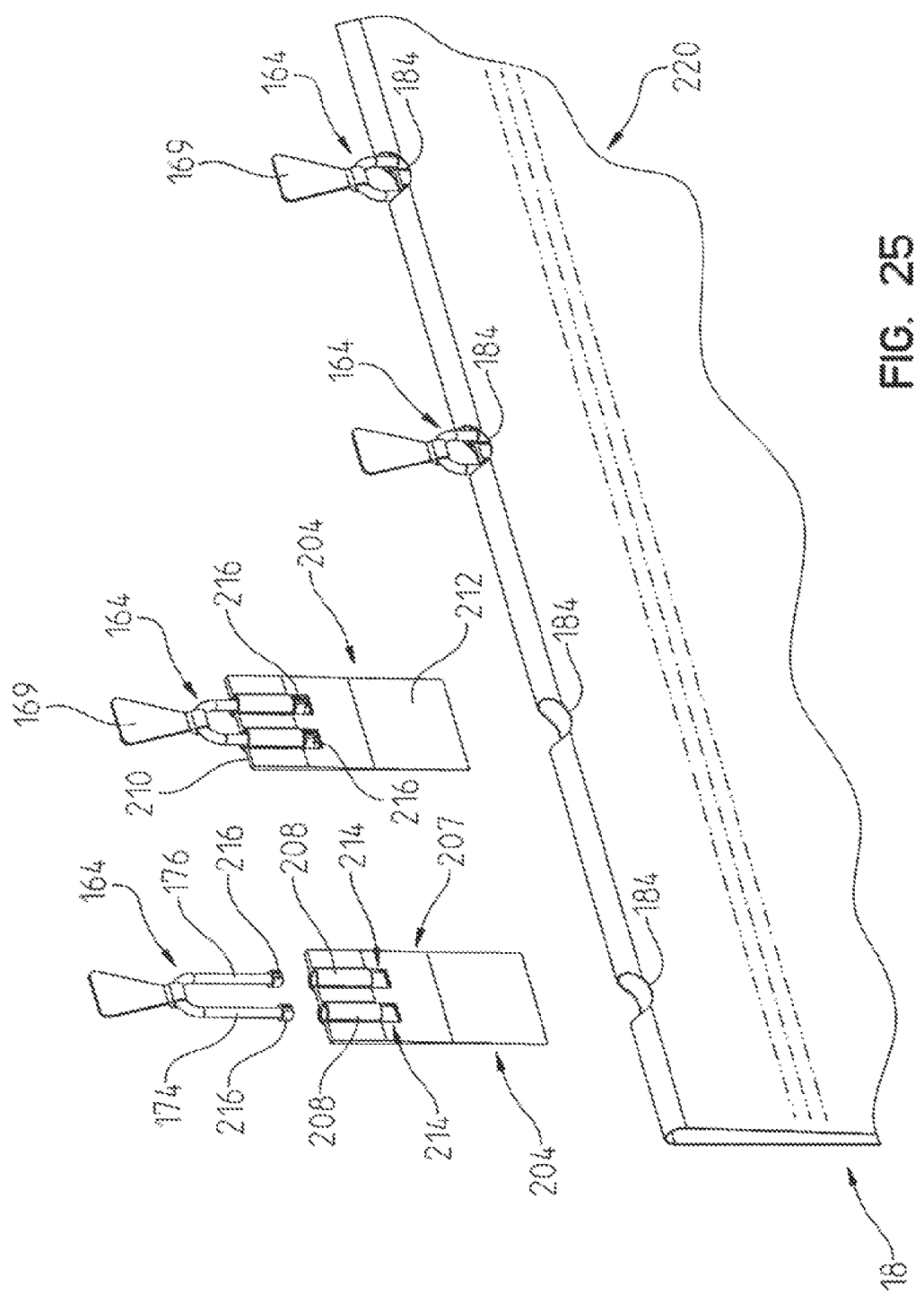
FIG. 25 is a perspective view showing a plate and elastic cord provided to couple the screen to the studs mounted on the frame.

As shown in FIG. 25, loop 164 may also be coupled to border 182 with plate or sheet 204 sandwiched between folds of border 182. Loops 164 and plate Sheet 204 includes a substantially rectangular body 207 and two tubes 208 having axes that are parallel to viewing surface 180 during use. Sheer 204 tapers from top 210 to bottom 212 and is preferably made of a molded plastic material. In the preferred embodiment, loops 164 and components, such as sheet 204, sheer 204', discussed below, plate 196, cooperate to define projection screen connectors that connect the remainder of projection screen 18 to projection screen frame 16.

Because sheet 204 tapers or wedge-shaped, it becomes more flexible from an outer end to an inner end as it approaches viewing surface 180. Sheet 204 includes a pair of openings 214 below tubes 208. First and second ends 174, 176 of loop 164 are provided with band clips 216 that have an outside diameter greater than the inside diameter of tubes 208 so that first and second terminal ends 174, 176 of loop 164 cannot be pulled from sheet 204. When fully assembled, terminal ends 174, 176 are preferable positioned within projection screen 18. Normally, band clips 216 are positioned in openings 214. To position clips 216 in openings 214, at least one end of first and second ends 174, 176 without a clip 216 is inserted through an upper end of a collar or tube 208 and through the lower end of tube 208 so that the respective end 174, 176 extends out of the respective opening 214. Then a band clip 216, which is larger than the opening in tubes 208, is crimped or otherwise fastened to the respective end 174, 176 so that the respective end 174, 176 of loop 164 cannot be pulled from sheet 204. The other end 176, 174 may be provided with a dip 216 in the same manner.

To couple loop 164 and sheet 204 to border 182, sheet 204 is positioned between folds of border 182 with loop 164 extending through opening 184 of border 182. Then thinner bottom 212 of sheet 204 and the folds of border 182 are sewn together so stitching 220 extends through bottom 218 and both folds of border 182.

Figure 30:
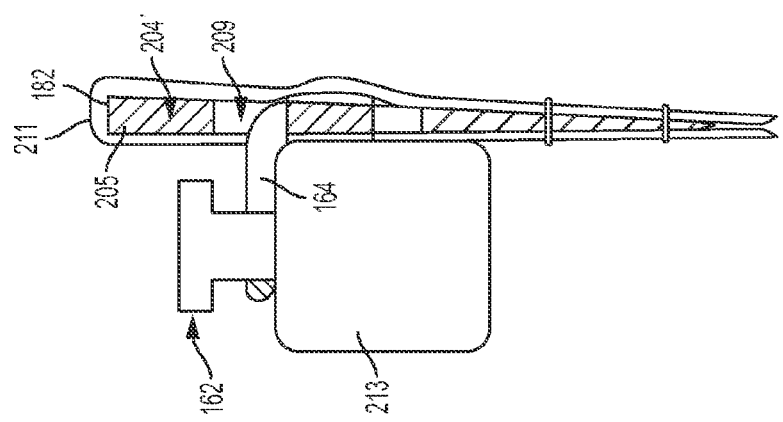
FIG. 30 is a cross-sectional view of an alternative embodiment loop connecting plate.

An alternative embodiment sheet 204' is shown in FIG. 30. Sheet 204' is similar to sheet 204, but includes an extension 205 and an aperture 209 through extension 205 through which loop 164 passes. Extensions 205 extend beyond posts 162 as shown to hide posts 162 from view. Border 182 extends around extensions 205 so that portions of projection screen 18 are positioned beyond posts 162. An upper edge 211 of projection screen 18 extends above an upper portion 213 of projection screen frame 16. Similarly, side edges of projection screen 18 extend beyond side portions 215 of projection screen frame 16 and lower edges of projection screen 18 extend below a lower portion 217 of projection screen frame 16.

Coupling devices other than loops 164 and posts 162 may also be used to couple screen 18 to frame 16. For example, snaps, hook-and-loop type fasteners, rope and grommets, and other coupling devices known to those of ordinary skill in the art may also be used.

To couple screen 18 to frame 16, screen 18 is positioned over frame 16 so that loops 164 align with posts 162. Loops 164 are then stretched over heads 166 of posts 162. When loops 164 are positioned over posts 162, screen 18 is under tension provided by the stretching of elastic loops 164.

The stiffness of frame 16 depends on the number of frame modules 26 coupled together to create a particular size frame 16. For example, frame 16D will normally be less stiff than frame 16A. On occasion, a frame 16 may be so large that its own weight and/or the weight of screen 18 supported by frame 16 may cause deflections in frame 16 that cause undesirable results, such as waves or other distortions in screen 18. Such distortions may detract from the image display on screen 18 from projector 12.

Figure 21:
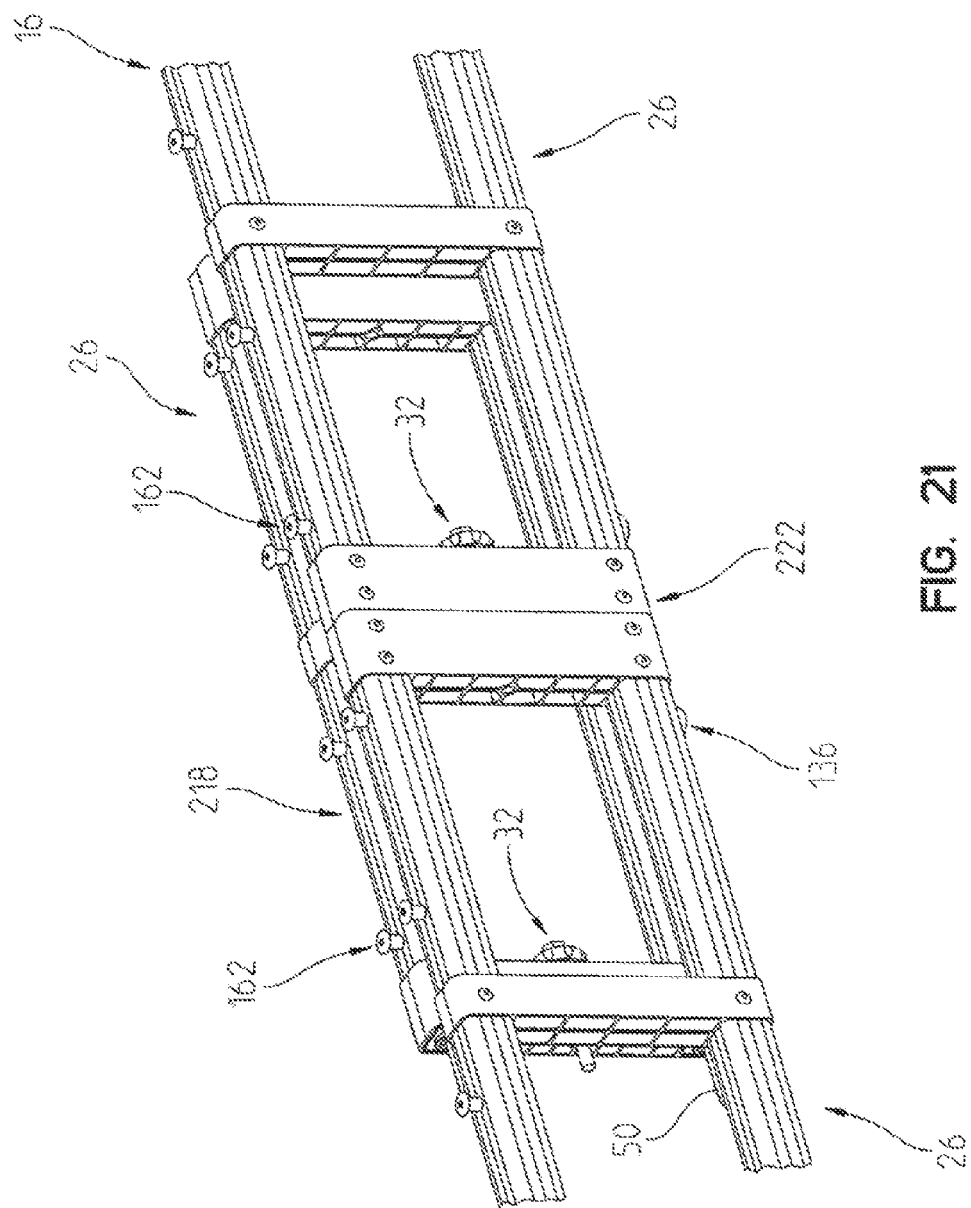
FIG. 21 is a perspective view of a pair of frame modules coupled end-to-end to form a joint therebetween and a third frame module coupled to the pair of frame modules to span and stiffen the joint.
Figure 23:
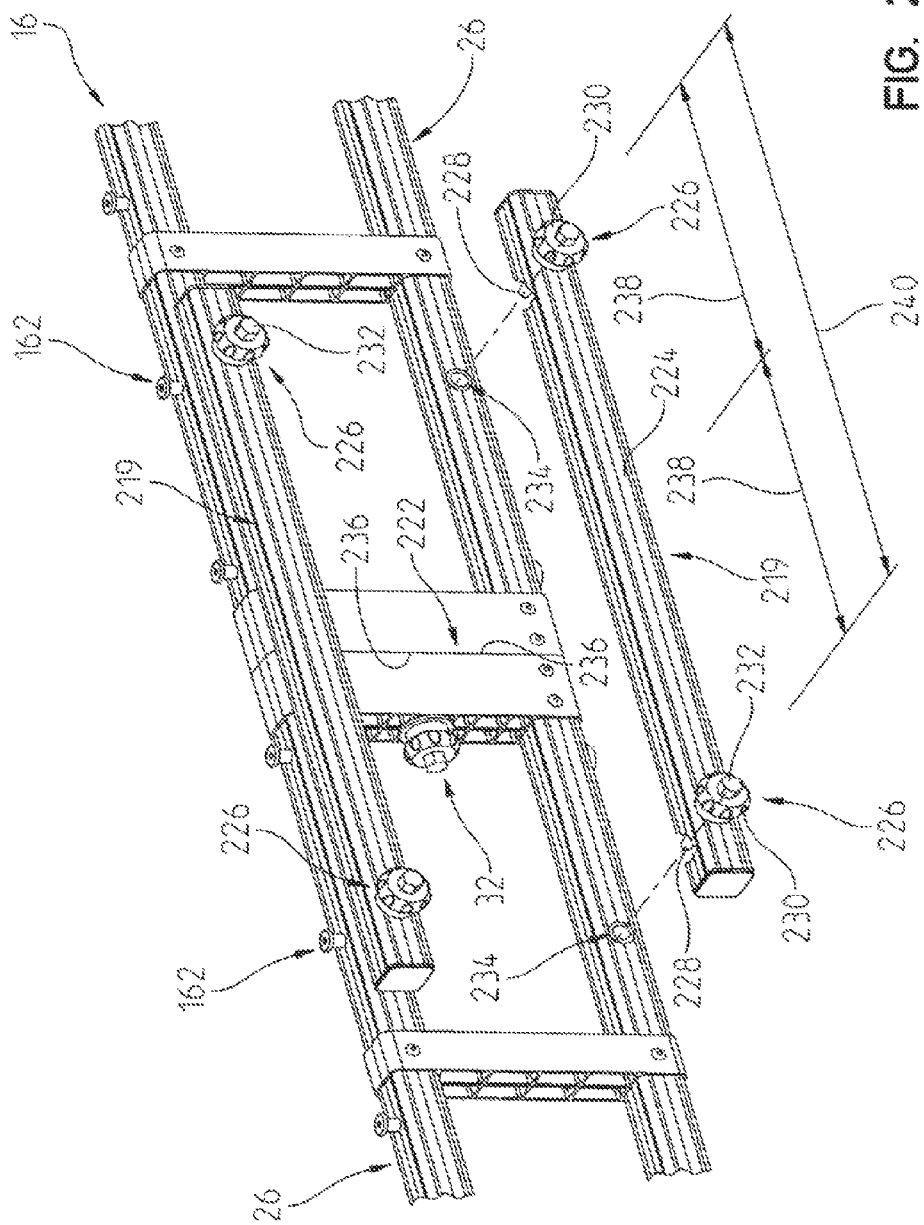
FIG. 23 is a perspective view similar to FIG. 21 showing a pair of bars coupled to the pair of frame modules to span and stiffen the joint.

To reduce such deflections, frame 16 may be provided with stiffening bars, such as stiffening bars 218, 219 shown in FIGS. 21 and 23. Stiffening bar 218 is preferably a module 26, such as module 26F, that is centered on joint 222 between adjacent modules 26 as shown in FIG. 21. Stiffening bar 218 is coupled to frame modules 26 to reduce separation in joint 222 and to increase the overall area moment of inertia or beam strength of that portion of frame 16. Stiffening bar 218 may be coupled to modules 26 using clamps 114, 142 or other coupling devices, such as bolts and other coupling devices know to those of ordinary skill in the art.

Stiffening bar 219 is illustrated in FIG. 23 and includes tube 224 and a pair of threaded posts or bolts 226, which each have a threaded shank 228, knob 230, and hex head 232. Each corner module 22, frame module 26, and base module 98 of legs 14 includes a plurality of threaded sockets 234 that are configured to receive threaded shanks 228. Sockets 234 are each spaced apart from longitudinal edges 236 of collars 56, 84 of corner modules 22, modules 26, and base modules 98 by an equal distance 238 so that sockets on opposite sides of joint 222 are spaced apart by equal distance 240, which is also the separation distance of shanks 228 on each stiffening bar 219. Therefore, stiffening bar 219 can be used to stiffen any joint 222 defined any combination of modules 26 with other modules 26, corner modules 22, or base modules 98 of legs 14.

To stiffen a joint 222 with stiffening bar 219, one of shanks 228 is aligned with a socket 234 on one side of joint 222 and threaded into this socket 234 by turning knob 230 or using a tool on hex head 232. Next, the other shank 228 on stiffening bar 219 is aligned with a socket 234 on the opposite side of joint 222 and threaded into this socket 234. When stiffening bars 219 are coupled to frame modules 26, joint 222 further resists separation and the second moment of area of that section of frame 16 increases. During disassembly of frame 16, shanks 228 are removed from sockets 234 by turning knob 230 or using a tool on hex head 232.

Screen 18 may be made of a number of materials suitable for projection screen applications. Preferably, screen 18 has a reflectivity gain from about 0.4 to about 2.5. Front projections screens are preferably white or light gray in appearance. Rear projection screens are preferably light gray in color and translucent to permit the projected image to transmit through the screen and be displayed to the audience. Some of the screens are acoustically transparent, like speaker cover fabric, to permit sound to be transmitted through the screen.

According to one embodiment, the screen includes a woven fiberglass backing with a vinyl reflective surface laminated to the fiberglass (gain of approximately 1.0). According to one embodiment, microscopic glass beads are provided on the viewing surface (gain from about 0.5 to about 2.5 depending on the viewing angle). According to another embodiment, the screen is made of a white (gain of about 1.0 or from about 0.4 to about 2.2 depending on the viewing angle) or light gray (gain of about 0.6 to 0.9 depending on the viewing angle) vinyl material without a backing. Other suitable projection screens known to those of ordinary skill in the art may also be provided. Preferably the screen is substantially blank so that it is substantially free of printing or other markings that noticeably de tract from the images projected on the screen. According to one embodiment, the substantially blank screen is provided with black borders that frame the screen for "wide screen" or other projection formats.

Figure 22:
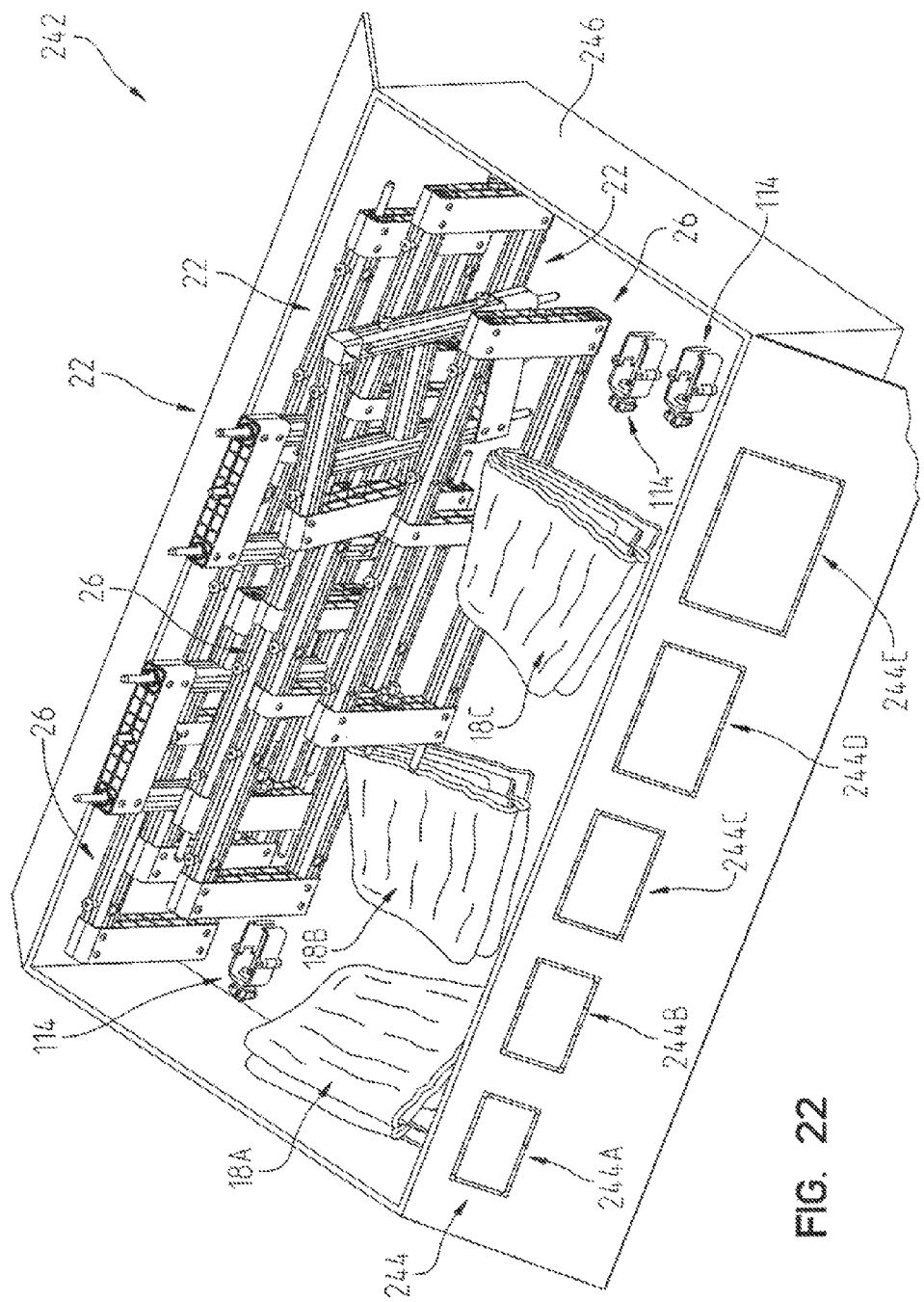
FIG. 22 is a perspective view of an projection screen kit including a container, multiple screens and frame components, and a frame diagram provided on the container.

As shown in FIG. 22, a kit 242 may be provided that includes multiple screens 18, such as screens 18A, 18B, 180, multiple frame modules 26, multiple corner modules 22, multiple leg base modules 98, clamps 114 (or 142), and container 246 holding the other components of kit 242. For illustrative purpose, not all corner modules 22 and frame modules 26 are shown in container 246 that are necessary to construct the required frames 16. According to one embodiment of the present disclosure, not enough frame modules 22, 26 are provided in container 246 to build sufficiently sized frames 16 for all of projection screens 18 provided in container 246 at one time.

In one example, if the kit includes three projection screens 18, only eight corner frame modules 22 may be provided, even though twelve corner frame modules 22 would be required to construct projection screen frames 16 for all of three projection screens 18 at one time. Further, if each projection screen frame 16 required eight frame modules 26, only eighteen frame modules 18 of various different sizes might be provided even though twenty four frame modules 26 would be required to construct projection screen frames 16 for all three projection screens at one time. Preferably, at least some of frame modules 26 can be used to construct different sized frames 18. On occasion at least some of frame modules 26 provided in the kit cannot be used to construct a projection screen frame 16 for one or more of screens 18 provided in the kit. However, such a frame module 26 will likely to useable for construction another projection screen frame 18 for one of the other projection screens 18 provided in the kit.

Because fewer frame modules 26 are provided that required to construct frame 16 for all projection screens 18 in the kit, there will be more projection screen components that corresponding projection screen frame components. For example, in total projection screens 18 in the kit will have more loops 164 that the total number of posts 162 provided in the frame modules 22, 26. Furthermore, the total perimeter length of the projection screens 18 in the kit is greater than the total length of the frame modules 22, 26. But, the total length of the frame modules 22, 26 is greater than the perimeter length of at least one of the screens 18 provided in the kit.

Preferably, the projection screens 18 provided in the kit are of different sizes. For example, one projection screen 18 may have a viewing surface greater than 10% larger than another projection screen 18 provided in the kit.

Diagrams or instructions 244 of various frame configurations may be provided on or with container 246. Each diagram or instruction 244 shows the necessary size and number of modules 26 necessary to build a frame 16 for a particular size screen 18. For example, left-most diagram 244A illustrates frame 16A for use with screen 18A; diagram 244B illustrates frame 16B for use with screen 18B; middle diagram 2440 illustrates frame 160 for use with screen 180, a diagram 244D illustrates frame 16D for use with screen 18D, and right-most diagram 244E illustrates a larger frame for use with a larger screen (not shown). In diagram 244, the various different sized frame modules 26 may be color coded, number, or provided with other identifiers. Similarly, each frame module 26 may be provided with matching color-coding, numbers, or other identifiers. For example, frame module 26F may be shown in red in diagram 244 and red marking is provided on frame module 26F. Whereas, frame module 26E may be shown in green in diagram 244 and green marking is provided on frame module 26E.

According to one method of using projection screen apparatus 10, a distributor, such as an equipment lessor, provides kit 242 at a location for a receiver, such as a lessee. In one example, an equipment lessor rents kit 242 to a lessee for use at a tradeshow. Upon receipt of kit 242 by the lessee from the lessor, the lessee can determine which size screen 18 is best suited for their need. Upon selecting the appropriate size screen 18, the lessee selects the appropriate size frame 16 that matches the selected screen 18. For example, upon receipt of kit 242, the lessee may determine that screen 180 is the right size and format for their needs. The lessee then selects frame 16C to construct and references diagram 2440 to determine which frame modules 26 to connect to corner modules 22 to construct frame 160.

Normally, kit 242 will include enough modules 26 to build any one of frames 16 for each different screen 18 provided in kit 242. For example, if kit 242 includes screens 18A-18D, at least two 26A modules, two 26C modules, six 26D modules, ten 26E modules, four 26F modules, and four corner modules 22 would be provided so that any one of frames 16A-16D could be constructed to support screens 18A-18D.

However, each kit 242 will normally not include enough modules 26 to build each frame 16 for each different screen 18 at the same time. For example, it would require at least two 26A modules, two 26C modules, fourteen 26D modules, twenty 26E modules, ten 26F modules, and sixteen corner modules 22 to build all of frames 18A-18D to support screens 18A-18D all at the same time. Kit 242 would not normally include all of these components.

Modules 26 from kit 242 that are not used to construct a frame 16 may be used for other purposes. For example, if frame 16D is built, six of the ten frame modules 26E, two of the four frame modules 26D, and all (two) of the frame modules 26A that are not used to construct from 16D may be used to construct legs 14 or as stiffening bars 218.

On occasion, one or more of the components of legs 14 and frame 16 that can be built from kit 242 or otherwise may become damaged. As a result, kit 242 may include an extra of each of frame modules 26A, 26B, 26C, 26D, 26E, 26F, corner module 22, and base module 98. If the preferred screen 18 is damaged, a smaller or larger screen 18 in kit 242 can be used. For example if screen 18B is preferred, but damaged, either screen 18A, 180, or 18D may be used with a matching frame (i.e. frame 16A, 16B, or 16D).

Upon return of kit 242 to the lessor can replace the damaged component of legs 14 or frame 16 without having to return the leg or frame 16 to the original manufacturer for repair. The lessor can replace the damaged component from stock on hand, from another kit 242, or order a replacement component from the original manufacturer.

On occasion, new screen formats are created that have different ratios of height to width than previous formats. When such a new format is created, kits 242 can be updated for the new format by providing new frame modules 26 of sufficient length to satisfy the new format. For example, if a wider format is created, a longer module 26 can be manufactured and provided in an existing kit 242. Along with the new, longer module 26, an updated diagram 244 showing the proper combination of frame modules 26 is provided to the assembler of the new format frame 16. With the new diagram, the assembler knows which of the frame modules 26, including the longer module 26, to assemble together to create the new format frame 16.

On occasion, it is possible that new combinations of existing frame modules 26 may result in the new format. For example, it may be possible to replace frame module 26A in frame 16B with frame module 26B to create a format having a taller profile. Along with any additional, required frame module 26B, an updated diagram 244 showing the proper combination of frame modules 26 is provided to the assembler of the new format frame 16. With the new diagram, the assembler knows which of the frame modules 26, including frame module 26B, to assemble together to create the new format frame 16.

In some uses, projection screen apparatus 10 is not provided in a kit that includes multiple screens 18. In such a situation, only enough frame components necessary to construct a frame 16 that supports the provided screen 18 are provided. Spare frame components to build this frame 16 may be provided in the event that one of the frame components breaks or otherwise needs repair or replacement.

Preferably, instructions for the assembly, installation, and/ or use of projection screen apparatus 10 are provided with projection screen apparatus 10 or otherwise communicated to permit a person or machine to assemble, install and/or use projection screen apparatus 10. Such instructions may include a description of any or all portions of projection screen apparatus 10 and/or any or all of the above-described assembly, installation, and use of projection screen apparatus 10 or components of projection screen apparatus 10. The instructions may be provided on separate papers and/or on the packaging in which projection screen apparatus 10 is sold or shipped. These instructions may also be provided over the Internet or other communication system. Furthermore, the instructions may be embodied as text, pictures, audio, video, or any other medium or method of communicating instructions known to those of ordinary skill in the art.

A method of constructing projection screen apparatus 10 may include the steps of receiving at least one pre-manufactured projection screen 18 and a plurality of pre-manufactured frame modules, such as corner frame module 22 and frame module 26, selecting a subset of the plurality of pre-manufactured frame modules 22, 26 sufficient to construct a projection screen frame 16 corresponding to at least one pre-manufactured projection screen 18, constructing projection screen frame 16 using the subset of the plurality of pre-manufactured frame modules 22, 26, and coupling pre-manufactured projection screen 18 to projection screen frame 16. A pre-manufactured projection screen 18 may be cut to size from a larger piece of material and have suitable connectors, such as connectors formed by loops 164 and sheets 204, attached thereto or suitable prepared to receive separate connectors. Pre-manufactured frame modules may be cut to length and provided with ends that mate or otherwise couple to adjacent frame modules 22, 26.

A method of facilitating constructing projection screen apparatus 10 may be provided. The method includes the steps of receiving projection screen 18, and a plurality of pre-manufactured frame modules, such as frame modules 22, 26, which may be sent from a party such as a manufacturer, rental dealer or otherwise, selecting a subset of the plurality of pre-manufactured frame modules sufficient to construct a projection screen frame 16 corresponding to the at least one pre-manufactured projection screen 18, providing the subset of the plurality of pre-manufactured frame modules 22, 26 to another party, such as a rental dealer or an end user, and providing instructions 244 on the construction of projection screen frame 16 from the pre-manufactured frame modules to the party.

Another method of facilitating construction of a projection screen apparatus 10 may be provided. The method includes the steps of providing a projection screen 18 requiring a projection screen frame 16 of a predetermined size to support the projection screen 18 during use, providing a plurality of frame modules greater than the number of projection frame modules 22, 26 necessary to construct the projection screen frame 18, sending the projection screen 16 to another party, and sending the plurality of frame modules 22, 26 to the party for use in constructing the projection screen frame 16 to support the projection screen 18 during use. This method may be performed by a manufacturer, a rental dealer, or another party.

Another method of facilitating construction of a projection screen apparatus 10 may be provided including the steps of collecting a plurality of projection screens 18 requiring a plurality of projection screen frames 16 of a predetermined size to support the plurality of projection screens 18 during use, collecting a plurality of projection screen frame modules 22, 26 less than the number of projection screen frame modules 22, 26 necessary to construct the plurality of projection screen frames 16 at one time, providing the plurality of projection screens 18 to another party, such as a rental dealer or end user, and providing the plurality of frame modules 22, 26 to the party for use in constructing at least one of the plurality of projection screen frames 16.

A method of constructing a projection screen apparatus 10 may be provided. The method includes the steps of providing a projection screen 18 and a plurality of frame modules, such as frame modules 22, 26. The plurality of frame modules 22, 26 may include at least two identical frame modules 22, 26. The method may further include constructing a projection screen frame 16 with the plurality of frame modules 22, 26 including at least one identical frame module, supporting the projection screen 18 with the projection screen frame 16, constructing at least one leg, such as leg 14, with the plurality of frame modules 24 including at least one identical frame module 26, and supporting the projection screen frame 16 with the at least one leg.

Figure 31:
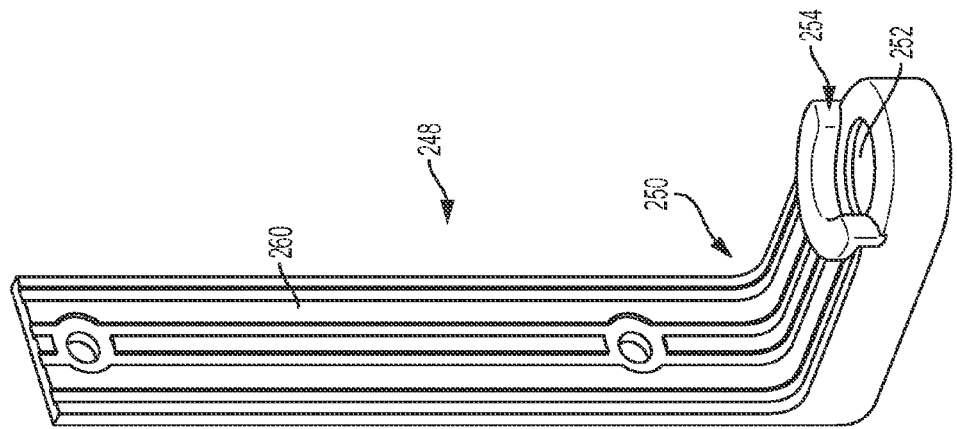
FIG. 31 is a perspective view of a drape support.

An addition to projection screen frame 16, other components may be provided to support a drape 99. As shown in FIG. 31, a drape support 248 is provided that couples to posts 162. Drape support 248 includes a body 250, preferably molded from plastic, and a magnet 252. Body 250 includes a recess or slot 254 having a wide portion 256 sized to receive head 166 of post 162 and a narrow portion 258 sized to receive shank 168 of post 162 as shown in FIGS. 32 and 33. Magnet 252 may be molded into body 250. When drape support 248 is coupled to post 162, magnet 252 is magnetically attracted to ferrous metal in post 162. Body 250 includes an extension 260 to which drape 99 is attached as shown in FIG. 32.

Multiple drape supports 248 are typically provided on lower portion 217 of frame 18 to provide drape 99 extending under projection screen 18. However, draper supports 248 may be coupled to posts 162 on top portion 213 and side portions 215 of projection screen frame 18.

Drape support 248 is one of several accessories that couple to post 162 in addition to a loop 164 being coupled to the respective post 162. For example, as shown in FIG. 32, posts 162 couples to loop 164 and to drape support 248.

Another such accessory that also couples to posts 162 is another projection screen 18. As shown in FIG. 34, a pair of loops 164 are coupled to a single posts 162. Thus, one projection screen 18 is positioned on one side of frame 16 and another projection screen is coupled to the opposite side of frame 16. As a result, two projection screens 18 can be supported by a single projection screen frame 16. To mask the back of a frame 16 sheet of material may, such as a projection screen or other sheet of material.

Figure 35:
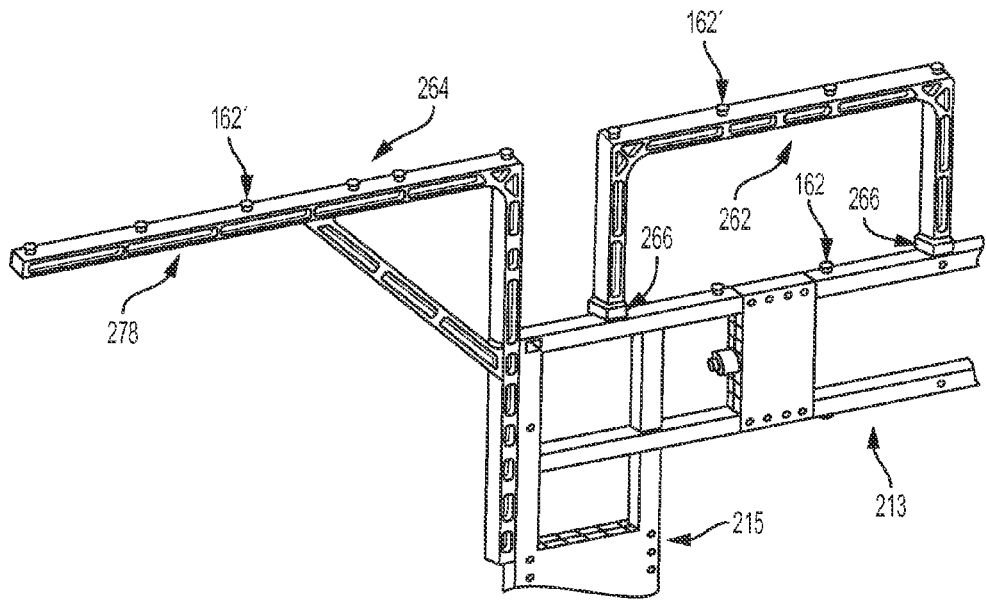
FIG. 35 is a perspective view of showing a pair of alternative embodiment drape supports.

Yet other accessories that also couple to posts 162 while loops 164 are coupled to posts 162 are shown in FIG. 35. U-shaped drape support 262 couple to posts 162 of top portion 213 of projection screen frame 18 and L-shaped drape 264 couples to posts 162 of side portions 215 of projection screen frame 18. Each drape support 262, 264 includes a plurality of posts 162'. Drape 99 may be provided with loops 164 that wrap around posts 162' to support drape 99 above projection screen 18 or to the sides of projection screen 18.

Figure 36:
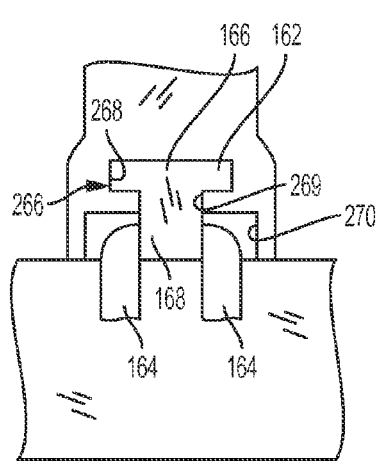
FIG. 36 is an end view showing a bottom of a upside down U-shaped drape support of FIG. 35.

Similar to drape support 248, drape support 262 includes two recesses 266 having wide portions 268 sized to receive head 166 of post 162 and narrow portions 269 sized to receive shank 168 of post 162 as shown in FIG. 36. Recess 266 further includes a loop-receiving portion 270 which allows loop 164 to couple screen 18 to post 162 frame 16 while drape support 262 is coupled to the same post 162.

Multiple drape supports 262 are typically provided on top portion 213 of frame 18 to provide drape 99 extending above projection screen 18. However, draper supports 262 may be coupled to posts 162 on bottom portion 217 and side portions 215 of projection screen frame 18.

Figure 37:
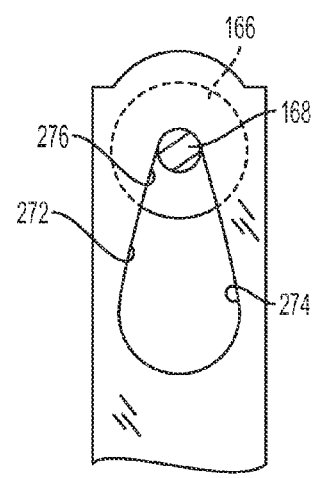
FIG. 37 is a side elevation view of a portion of an alternative embodiment drape support of FIG. 35 coupled to a post of the projection screen frame.

L-shaped drape support 264 includes recesses or slots 272, one shown in FIG. 37, also sized to receive posts 162. Recess 272 has a wide bottom 274 sized to allow head 166 of post 162 therethrough and a narrow top 276 sized to receive shank 168 and not allow head 166 to pass therethrough. During assembly, heads 166 of posts 166 are aligned with wide bottoms 274 of recesses 272 of L-shaped drape support 264 and heads 166 are inserted into L-shaped drape support 264. L-shaped drape support 264 is then lowered to that shanks 168 are positioned in narrow top 276. Because heads 166 cannot be removed through narrow top 276, drape support 264 is coupled to frame 16. To remove drape support 264, drape support is pushed upward. According to an alternative embodiment of the L-shaped drape support 264, upper bar 278 slides horizontally along the remainder of L-shaped drape support 264. Upper bar 278 slides in a track (not shown) provided below upper bar 278. The sliding connection allows posts 162' to translate from side to side.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A projection screen kit including
a plurality of projection screens including
a first projection screen having a first viewing area adapted to display an image projected onto the first projection screen, and
a second projection screen having a second viewing area adapted to display an image projected onto the second projection screen, wherein the second viewing area is at least 10% larger than the first viewing area, and
a plurality of frame modules adapted to be assembled to define an assembled frame for each of the plurality of projection screens, each assembled frame being locked together independent of the plurality of projection screens and sized to support at least one of the plurality of projection screens, each assembled frame for the plurality of projection screens requiring a number of frame modules to support at least one of the plurality of projection screens, a total number of frame modules in the kit being less than a sum of the frame modules required to assemble all of the plurality of assembled frames at one time.

2. A projection screen kit including
a plurality of projection screens including
a first projection screen having a first viewing area adapted to display an image projected onto the first projection screen, and
a second projection screen having a second viewing area adapted to display an image projected onto the second projection screen,
a plurality of frame modules adapted to be assembled to define an assembled frame for each of the plurality of projection screens, each assembled frame being locked together independent of the plurality of projection screens and sized to support at least one of the plurality of projection screens, each assembled frame for the plurality of projection screens requiring a number of frame modules to support at least one of the plurality of projection screens, a total number of frame modules in the kit being less than a sum of the frame modules required to assemble all of the plurality of assembled frames at one time, and
a container having an interior region receiving the plurality of projection screens and the plurality of frame modules.

3. A projection screen kit including
a plurality of projection screens including
a first projection screen having a first viewing area adapted to display an image projected onto the first projection screen, and
a second projection screen having a second viewing area adapted to display an image projected onto the second projection screen, and
a plurality of frame modules adapted to be assembled to define an assembled frame for each of the plurality of projection screens, each assembled frame being sized to support at least one of the plurality of projection screens, each assembled frame for the plurality of projection screens requiring a number of frame modules to support at least one of the plurality of projection screens, a total number of frame modules in the kit being less than a sum of the frame modules required to assemble all of the plurality of assembled frames at one time, wherein the plurality of frame modules includes at least one frame module that is not sized to cooperate with a combination of other frame modules to define a projection screen frame suitable for at least one of the plurality of projection screens.

4. A projection screen kit including
a plurality of projection screens including
a first projection screen having a first viewing area adapted to display an image projected onto the first projection screen, and
a second projection screen having a second viewing area adapted to display an image projected onto the second projection screen, and
a plurality of frame modules adapted to be assembled to define an assembled frame for each of the plurality of projection screens, each assembled frame being locked together independent of the plurality of projection screens and sized to support at least one of the plurality of projection screens, each assembled frame for the plurality of projection screens requiring a number of frame modules to support at least one of the plurality of projection screens, a total number of frame modules in the kit being less than a sum of the frame modules required to assemble all of the plurality of assembled frames at one time, wherein the plurality of frame modules have a length, the plurality of projection screens each have a perimeter length, and a total length of the plurality of frame modules is greater than at least one of the perimeter lengths of the plurality of projections screens and less than a total sum of the perimeter lengths of the plurality of projection screens.

5. A method of constructing a projection screen apparatus including the steps of
receiving at least one pre-manufactured projection screen and a plurality of pre-manufactured frame modules,
selecting a subset of the plurality of pre-manufactured frame modules sufficient to construct a projection screen frame corresponding to the at least one pre-manufactured projection screen,
constructing the projection screen frame using the subset of the plurality of pre-manufactured frame modules, wherein the subset of the plurality of pre-manufactured frame modules lock together independent of the at least one pre-manufactured projection screen,
coupling a first pre-manufactured projection screen to the projection screen frame, and
receiving at least a second pre-manufactured projection screen larger than the first pre-manufactured projection screen received in the receiving step, wherein the subset of the plurality of pre-manufactured frame modules is insufficient to construct a projection screen frame corresponding to the second pre-manufactured projection screen.

6. A method of constructing a projection screen apparatus including the steps of
receiving at least one pre-manufactured projection screen and a plurality of pre-manufactured frame modules,
selecting a subset of the plurality of pre-manufactured frame modules sufficient to construct a projection screen frame corresponding to the at least one pre-manufactured projection screen,
constructing the projection screen frame using the subset of the plurality of pre-manufactured frame modules, wherein the subset of the plurality of pre-manufactured frame modules lock together independent of the at least one pre-manufactured projection screen,
coupling the at least one pre-manufactured projection screen to the projection screen frame,
damaging one of the pre-manufactured frame modules selected for the subset, and replacing the damaged pre-manufactured frame module with a pre-manufactured frame module that was received in the receiving step and not selected for the subset.

7. A method of constructing a projection screen apparatus including the steps of
receiving at least one pre-manufactured projection screen and a plurality of pre-manufactured frame modules,
selecting a subset of the plurality of pre-manufactured frame modules sufficient to construct a projection screen frame corresponding to the at least one pre-manufactured projection screen,
constructing the projection screen frame using the subset of the plurality of pre-manufactured frame modules, wherein the subset of the plurality of pre-manufactured frame modules lock together independent of the at least one pre-manufactured projection screen, and
coupling the at least one pre-manufactured projection screen to the projection screen frame, wherein the at least one pre-manufactured projection screen and the plurality of pre-manufactured frame modules are received together during the receiving step.

8. A method of constructing a projection screen apparatus including the steps of
receiving at least one pre-manufactured projection screen and a plurality of pre-manufactured frame modules,
selecting a subset of the plurality of pre-manufactured frame modules sufficient to construct a projection screen frame corresponding to the at least one pre-manufactured projection screen,
constructing the projection screen frame using the subset of the plurality of pre-manufactured frame modules, and
coupling a first one of the at least one pre-manufactured projection screen to the projection screen frame, wherein the first one of the at least one pre-manufactured projection screen includes a plurality of connectors and the plurality of pre-manufactured frame modules include a plurality of connectors configured to couple with the plurality of connectors of the first one of the at least one pre-manufactured projection screen, a total number of the plurality of connectors of the plurality of pre-manufactured frame modules being greater than a total number of connectors of the first one of the at least one pre-manufactured projection screen.

9. A method of facilitating constructing a projection screen apparatus including the steps of
receiving at least one pre-manufactured projection screen and a plurality of pre-manufactured frame modules,
selecting a subset of the plurality of pre-manufactured frame modules sufficient to construct a projection screen frame corresponding to the at least one pre-manufactured projection screen,
providing the subset of the plurality of pre-manufactured frame modules to a party,
providing instructions on construction of the projection screen frame from the plurality of pre-manufactured frame modules to the party, and
providing instructions on construction of a leg from the plurality of pre-manufactured frame modules for supporting the projection screen frame, wherein the instructions for constructing the leg includes reference to the plurality of pre-manufactured frame modules usable for constructing the projection screen frame.

10. A method of facilitating constructing a projection screen apparatus including the steps of
receiving at least one pre-manufactured projection screen and a plurality of pre-manufactured frame modules,
selecting a subset of the plurality of pre-manufactured frame modules sufficient to construct a projection screen frame corresponding to the at least one pre-manufactured projection screen,
providing the subset of the plurality of pre-manufactured frame modules to a party, and
providing instructions on construction of the projection screen frame from the subset of the plurality of pre-manufactured frame modules to the party, wherein the instructions include guidance for constructing frames of different sizes using the plurality of pre-manufactured frame modules and the subset of the plurality of pre-manufactured frame modules used to construct the projection screen frame lock together in use independent of the at least one pre-manufactured projection screen.

11. A method of facilitating construction of a projection screen apparatus including the steps of
providing a plurality of projection screens requiring a plurality of projection screen frames of a predetermined size to support the plurality of projection screens during use,
providing a plurality of frame modules greater than a number of projection frame modules necessary to construct the plurality of projection screen frames, wherein the plurality of frame modules provided is an insufficient number of projection frame modules necessary to construct all of the plurality of projection screen frames at the same time, sending the plurality of projection screens to a party, and sending the plurality of frame modules to the party for use in constructing the plurality of projection screen frames to support the plurality of projection screens during use, wherein the plurality of frame modules used to construct a constructed projection screen frame lock together in use independent of the plurality of projection screens.

12. A method of facilitating construction of a projection screen apparatus including the steps of providing a projection screen requiring a projection screen frame of a predetermined size to support the projection screen during use, providing a plurality of frame modules greater than a number of projection frame modules necessary to construct the projection screen frame, sending the projection screen to a party, and sending the plurality of frame modules to the party for use in constructing the projection screen frame to support the projection screen during use, wherein the projection screen includes a plurality of connectors, the plurality of frame modules includes a plurality of connectors for connecting with the plurality of connectors of the projection screen, and a total number of connectors of the plurality of frame modules is greater than a total number of connectors of the projection screen.

13. A method of facilitating construction of a projection screen apparatus including the steps of providing a projection screen having a first screen format and requiring a projection screen frame of a predetermined size to support the projection screen during use, providing a plurality of frame modules greater than a number of frame modules which lock together in use independent of the projection screen necessary to construct the projection screen frame, sending the projection screen to a party, sending the plurality of frame modules to the party for use in constructing the projection screen frame to support the projection screen during use, and providing a second projection screen having a second screen format different than the first screen format provided in the step of providing the projection screen.

14. The method of claim 13, further providing the step of providing instructions to the party for use of the plurality of frame modules to construct a projection screen frame for the second projection screen.

15. A method of facilitating construction of a projection screen apparatus including the steps of collecting a plurality of projection screens requiring a plurality of projection screen frames of a predetermined size to support the plurality of projection screens during use, collecting a plurality of projection screen frame modules less than a number of projection screen frame modules necessary to construct the plurality of projection screen frames at one time, providing the plurality of projection screens to a party, providing the plurality of projection screen frame modules to the party for use in constructing at least one of the plurality of projection screen frames, wherein the plurality of projection screen frame modules lock together in use independent of the plurality of projection screens, and providing instructions on selecting a subset of the plurality of projection screen frame modules to construct one of the plurality of projection screen frames.

16. A method of facilitating construction of a projection screen apparatus including the steps of collecting a plurality of projection screens requiring a plurality of projection screen frames of a predetermined size to support the plurality of projection screens during use, collecting a plurality of projection screen frame modules less than a number of projection screen frame modules necessary to construct the plurality of projection screen frames at one time, providing the plurality of projection screens to a party, and providing the plurality of projection screen frame modules to the party for use in constructing at least one of the plurality of projection screen frames, wherein the plurality of projection screen frame modules lock together in use independent of the plurality of projection screens and the plurality of projection screens include a plurality of connectors, the plurality of projection screen frame modules include connectors for supporting the plurality of projection screens on the plurality of projection screen frames, and a total number of the plurality of connectors of the plurality of projection screens is greater than a total number of connectors of the plurality of projection screen frame modules.

17. A method of facilitating construction of a projection screen apparatus including the steps of collecting a plurality of projection screens requiring a plurality of projection screen frames of a predetermined size to support the plurality of projection screens during use, collecting a plurality of projection screen frame modules less than a number of projection screen frame modules necessary to construct the plurality of projection screen frames at one time, providing the plurality of projection screens to a party, and providing the plurality of projection screen frame modules to the party for use in constructing at least one of the plurality of projection screen frames, wherein a largest of the plurality projection screens requires a first number of projection screen frame modules to construct a frame of sufficient size to support the largest of the plurality of projection screens and a total number of the plurality of projection screen frame modules is greater than the first number of projection screen frame modules.

18. A method of facilitating construction of a projection screen apparatus including the steps of collecting a plurality of projection screens requiring a plurality of projection screen frames of a predetermined size to support the plurality of projection screens during use, collecting a plurality of projection screen frame modules less than a number of projection screen frame modules necessary to construct the plurality of projection screen frames at one time, providing the plurality of projection screens to a party, and providing the plurality of projection screen frame modules to the party for use in constructing at least one of the plurality of projection screen frames, wherein the plurality of projection screen frame modules lock together in use independent of the plurality of projection screens and the plurality of projection screens includes at least a first projection screen and a second projection screen that is at least 10% larger than the first projection screen.

* * * * *